US012164413B2

(12) United States Patent
Mola

(10) Patent No.: US 12,164,413 B2
(45) Date of Patent: Dec. 10, 2024

(54) MEMORY PAGE MARKINGS AS LOGGING CUES FOR PROCESSOR-BASED EXECUTION TRACING

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/921,048

(22) PCT Filed: Apr. 30, 2021

(86) PCT No.: PCT/US2021/030222
§ 371 (c)(1),
(2) Date: Oct. 24, 2022

(87) PCT Pub. No.: WO2021/225896
PCT Pub. Date: Nov. 11, 2021

(65) Prior Publication Data
US 2023/0342282 A1  Oct. 26, 2023

(30) Foreign Application Priority Data
May 5, 2020 (LU) .................................. LU101770

(51) Int. Cl.
*G06F 11/36* (2006.01)
*G06F 12/0875* (2016.01)

(52) U.S. Cl.
CPC ...... *G06F 11/3636* (2013.01); *G06F 12/0875* (2013.01); *G06F 2212/608* (2013.01)

(58) Field of Classification Search
CPC ............. G06F 11/3636; G06F 12/0875; G06F 2212/608
(Continued)

(56) References Cited

U.S. PATENT DOCUMENTS 8,051,247 B1  11/2011  Favor
8,370,576 B1  2/2013  Favor
(Continued)

OTHER PUBLICATIONS

Dunlap, George W., et al. "ReVirt: Enabling intrusion analysis through virtual-machine logging and replay." ACM SIGOPS Operating Systems Review 36.SI (2002): pp. 211-224. (Year: 2002).*
(Continued)

*Primary Examiner* — Satish Rampuria
(74) *Attorney, Agent, or Firm* — Workman Nydegger

(57) ABSTRACT

Cache-based tracing based on categorizing memory regions as being logged or not logged. A computer system identifies a first memory region within a first memory space of a first context, and determines that the first context is in a logging state. The computer system configures a data structure to categorize the first memory region as being logged. The data structure also categorizes a second memory region corresponding to a second context as being not logged. The computer system exposes the data structure to a processor. Upon detecting a memory access by a processing unit, the processor uses determinations of one or more of (i) whether a target memory address is categorized as being logged or not logged, (ii) whether an executing context is logging or not non-logging, or (iii) a type of the memory access to initiate a logging action or refrain from the logging action.

20 Claims, 8 Drawing Sheets

600

| Execution Context | Memory Region | On A Cache Miss... | On A Committed Write... |
|---|---|---|---|
| Logging | Logged | Log the cache miss  601 | No logging needed (write reproducible)  602 |
| Logging | Not Logged | Logging<br>- Log the cache miss<br>- Log as uncached read<br>- Update memory categorization<br>Non-Logging<br>- Fault<br>- Don't log (incomplete)  603 | No logging needed (write reproducible)  604 |
| Non-Logging | Logged | Log the cache miss  605 | - Log the write<br>- Write cache line and evict<br>- Use CCP to postpone<br>- Use tracking info to postpone  606 |
| Non-Logging | Not Logged | No logging needed  607 | No logging needed  608 |

(58) Field of Classification Search
USPC .................................................. 717/109–178
See application file for complete search history.

(56) References Cited

U.S. PATENT DOCUMENTS

| | | | |
|---|---|---|---|
| 8,370,609 | B1 | 2/2013 | Favor |
| 8,487,895 | B1 | 7/2013 | Brown |
| 9,195,593 | B1 * | 11/2015 | Radovic ............. G06F 11/1048 |
| 9,432,298 | B1 | 8/2016 | Smith |
| 9,471,313 | B1 | 10/2016 | Busaba |
| 9,934,127 | B1 | 4/2018 | Mola et al. |
| 9,973,465 | B1 | 5/2018 | Linkous |
| 9,996,287 | B2 | 6/2018 | Dornemann |
| 10,089,230 | B1 | 10/2018 | Koker |
| 10,635,555 | B2 | 4/2020 | Grosser |
| 11,405,189 | B1 | 8/2022 | Bennison |
| 11,474,871 | B1 | 10/2022 | Mittal |
| 12,079,155 | B2 | 9/2024 | Ray |
| 2002/0073063 | A1 | 6/2002 | Faraj |
| 2014/0112339 | A1 | 4/2014 | Safranek et al. |
| 2016/0239431 | A1 * | 8/2016 | Li ....................... G06F 12/1009 |
| 2018/0060215 | A1 | 3/2018 | Mola |
| 2018/0101483 | A1 * | 4/2018 | Catthoor ............. G06F 12/1054 |
| 2018/0165199 | A1 | 6/2018 | Brandt |
| 2019/0087305 | A1 * | 3/2019 | Mola ................... G06F 11/3476 |
| 2019/0065339 | A1 | 5/2019 | Mola |
| 2019/0180407 | A1 | 6/2019 | Goossen et al. |
| 2019/0220403 | A1 | 7/2019 | Mola |
| 2019/0258556 | A1 | 8/2019 | Mola |
| 2019/0266090 | A1 * | 8/2019 | Mola ................... G06F 11/3476 |
| 2019/0286549 | A1 * | 9/2019 | Mola ................... G06F 21/6218 |
| 2020/0026639 | A1 | 1/2020 | Mola |
| 2020/0349051 | A1 | 11/2020 | Mola |
| 2023/0176971 | A1 | 6/2023 | Mola |
| 2024/0095187 | A1 | 3/2024 | Mola |

OTHER PUBLICATIONS

Polyn, Sean M., et al. "Category-specific cortical activity precedes retrieval during memory search." Science 310.5756 (2005): pp. 1963-1966. (Year: 2005).*

Lee, Sang-Won, and Bongki Moon. "Design of flash-based DBMS: an in-page logging approach." Proceedings of the 2007 ACM SIGMOD international conference on Management of data. 2007. pp. 55-66 (Year: 2007).*

U.S. Appl. No. 17/921,063, filed Oct. 24, 2022.
U.S. Appl. No. 17/921,067, filed Oct. 24, 2022.
Basu, et al., "Software Assisted Hardware Cache Coherence for Heterogeneous Processors", Proceedings of the Second International Symposium on Memory Systems, Oct. 3, 2016, pp. 279-288.
Kaushik, et al., "Designing Predictable Cache Coherence Protocols for Multi-Core Real-Time Systems", IEEE Transactions on Computers, vol. 70, Issue 12, Nov. 12, 2020, pp. 2098-2111.
Non-Final Office Action mailed on Apr. 15, 2024, in U.S. Appl. No. 17/921,067 (MS# 408300-US01-PCT), 21 pages.
U.S. Appl. No. 17/921,053, filed May 4, 2021.
Feldman, et al., "IGOR: A System for Program Debugging via Reversible Execution", In Proceedings of ACM SIGPLAN and SIGOPS Workshop on Parallel and Distributed Debugging, Nov. 1, 1988, pp. 112-123.
"Search Report and Written Opinion Issued in Luxembourg Patent Application No. LU101767", Mailed Date: Feb. 26, 2021, 13 Pages. (MS# 408300-LU-NP).
"Search Report and Written Opinion Issued in Luxembourg Patent Application No. LU101768", Mailed Date: Feb. 10, 2021, 11 Pages. (MS# 408259-LU-NP).
"Invitation to Pay Additional Fees Issued in PCT Application No. PCT/US21/030222", Malled Date: Aug. 12, 2021, 14 Pages. (MS# 408277-WO-PCT).
"Search Report and Written Opinion Issued in Luxembourg Application No. LU101770", Mailed Date: Feb. 5, 2021, 12 Pages. (MS# 408277-LU-NP).
"International Search Report & Written Opinion Issued in PCT Application No. PCT/US21/030199", Mailed Date: Aug. 27, 2021, 15 Pages. (MS# 408259-WO-PCT).
"International Search Report & Written Opinion Issued in PCT Application No. PCT/US21/030220", Mailed Date: Aug. 25, 2021, 16 Pages. (MS# 408300-WO-PCT).
"International Search Report & Written Opinion Issued in PCT Application No. PCT/US21/030222", Malled Date : Oct. 8, 2021, 18 Pages. (MS# 408277-WO-PCT).
U.S. Appl. No. 17/921,063, filed Apr. 30, 2021.
U.S. Appl. No. 17/921,067, filed Apr. 30, 2021.
Non-Final Office Action mailed on Jul. 31, 2024, in U.S. Appl. No. 17/921,063, 18 pages.
Ciriani et al, "Combining Fragmentation and Encryption to Protect Privacy in Data Storage", ACM Transactions on Information and System Security, vol. 13, Issue No. 1, 2010, pp. 1-33.
Luo, et al, "Public Trace-and-Revoke Proxy Re-Encryption for Secure Data Shring in Clouds", IEEE Transactions on Information Forensics and Security, vol. 19, 2024, pp. 2919-2934.
Lyu, et al, "Directed Test Generation for Validation of Cache Coherence Protocols", IEEE Transactions on Computer-Aided Design of the Integrated Curcuits and Systems, vol. 38, Issue No. 1, 2019, pp. 163-176.

* cited by examiner

| Execution Context | Memory Region | On A Cache Miss... | On A Committed Write... |
|---|---|---|---|
| Logging | Logged | Log the cache miss  601 | No logging needed (write reproducible)  602 |
| Logging | Not Logged | Logging<br>- Log the cache miss<br>- Log as uncached read<br>- Update memory categorization<br><br>Non-Logging<br>- Fault<br>- Don't log (incomplete)  603 | No logging needed (write reproducible)  604 |
| Non-Logging | Logged | Log the cache miss  605 | - Log the write<br>- Write cache line and evict<br>- Use CCP to postpone<br>- Use tracking info to postpone  606 |
| Non-Logging | Not Logged | No logging needed  607 | No logging needed  608 |

MEMORY PAGE MARKINGS AS LOGGING CUES FOR PROCESSOR-BASED EXECUTION TRACING

CROSS-REFERENCE TO RELATED APPLICATIONS

The present application is a U.S. National Stage of International Application No. PCT/US2021/030222, filed on Apr. 30, 2021, designating the United States and claiming the priority of Luxembourg Patent Application No. LU101770 filed with the Luxembourg Intellectual Property Office on May 5, 2020. All of the aforementioned applications are incorporated herein in their respective entireties by this reference.

TECHNICAL FIELD

The present disclosure relates to systems, methods, and devices for reducing the computing overheads associated with recording a replayable execution trace of a computer program.

BACKGROUND

Tracking down and correcting undesired software behaviors is a core activity in software development. Undesired software behaviors can include many things, such as execution crashes, runtime exceptions, slow execution performance, incorrect data results, data corruption, and the like. Undesired software behaviors are triggered by a vast variety of factors such as data inputs, user inputs, race conditions (e.g., when accessing shared resources), etc. Given the variety of triggers, undesired software behaviors are often rare and seemingly random, and extremely difficult to reproduce. As such, it is often very time-consuming and difficult for a developer to identify a given undesired software behavior. Once an undesired software behavior has been identified, it is again often time-consuming and difficult to determine its root cause(s).

Developers have used a variety of approaches to identify undesired software behaviors, and to then identify the location(s) in an application's code that cause the undesired software behavior. For example, developers often test different portions of an application's code against different inputs (e.g., unit testing). As another example, developers often reason about execution of an application's code in a debugger (e.g., by setting breakpoints/watchpoints, by stepping through lines of code, etc. as the code executes). As another example, developers often observe code execution behaviors (e.g., timing, coverage) in a profiler. As another example, developers often insert diagnostic code (e.g., trace statements) into the application's code.

While conventional diagnostic tools (e.g., debuggers, profilers, etc.) have operated on "live" forward-executing code, an emerging form of diagnostic tools enable "historic" debugging (also referred to as "time travel" or "reverse" debugging), in which the execution of at least a portion of an execution context is recorded into one or more trace files (i.e., an execution trace). Using some tracing techniques, an execution trace can contain "bit-accurate" historic execution trace data, which enables the recorded portion(s) the traced execution context to be virtually "replayed" (e.g., via emulation) down to the granularity of individual instructions (e.g., machine code instructions, intermediate language code instructions, etc.). Thus, using "bit-accurate" trace data, diagnostic tools enable developers to reason about a recorded prior execution of subject context, as opposed to conventional debugging which is limited to a "live" forward execution. For example, using replayable execution traces, some historic debuggers provide user experiences that enable both forward and reverse breakpoints/watchpoints, that enable code to be stepped through both forwards and backwards, etc. Some historic profilers, on the other hand, are able to derive code execution behaviors (e.g., timing, coverage) from prior-executed code.

Some techniques for recording execution traces operate based largely on recording influxes to a microprocessor's (processor's) cache. However, since modern processors commonly execute at the rate of tens- to hundreds-of thousands of MIPS (millions of instructions per second), replayable execution traces of a program's thread can capture vast amounts of information, even if mere fractions of a second of the thread's execution are captured. As such, replayable execution traces quickly grow very large in size in memory and/or on disk. Some cache-based tracing techniques operate to reduce trace size by adding "tracking bits" to a processor's cache that track whether or not each cache line has been logged into a trace. However, adding tracking bits to the processor cache increases the physical integrated circuit (IC) die size of the processor by non-trivial amounts. In addition, implementing the logic to control those tracking bits further increases IC die size, and introduces tracking overheads into critical execution paths of memory access instructions. As such, the addition of tracking bits, and corresponding control logic, leads to significant processor performance and design trade-offs, and has the potential to decrease yields during processor fabrication through increases in IC die size.

BRIEF SUMMARY

At least some embodiments described herein alleviate the processor performance, design, and fabrication challenges associated with the use of cache-based tracking bits for recording replayable execution traces. In particular, at least some embodiments described herein eliminate the use of tracking bits within a processor cache, without sacrificing the benefits of their use, by using memory markings as logging cues for processor-based execution tracing. These embodiments categorize different memory regions, such as physical memory pages, as being logged or not logged based, at least in part, on whether or not logging is enabled or disabled for a corresponding execution context. When processing a memory access, a processor accesses these memory markings to determine if the memory region to which the memory access is targeted is categorized as logged or not logged. The processor then uses the determination as an input to determine whether or not to perform a logging action for the memory access.

As will be appreciated in view of the disclosure herein, when compared to the use of cache-based tracking bits, the use of memory markings as logging cues for processor-based execution tracing decreases the complexity of processor design, pushes tracking logic out of the critical execution paths of the processor, and can be implemented within smaller IC die sizes. At the same time, the use of memory markings as logging cues can reduce trace size in many of the same ways as the use of cache-based tracking bits. For example, use of memory markings eliminates redundant logging of many cache influxes that were previously cache evictions, and limits logging to only the memory spaces associated with execution contexts that are actually in a logging state.

Embodiments are directed to methods, systems, and computer program products for communicating, to a processor, a categorization of a region in the memory as being logged or not logged. In these embodiments a computer system, which comprises a processor and a memory, identifies a first context that is configured for execution at the processor, and identifies a first region within the memory. The first region corresponds to at least a portion of a first memory space of the first context. The computer system determines that the first context is assigned a logging state, and configures a data structure with a first categorization of the first region as being logged. The data structure also includes a second categorization of a second region within the memory as being not logged. The second region corresponds to at least a portion of a second memory space of a second context that is configured for execution at the processor and that is assigned a non-logging state. The computer system communicates, to the processor, at least one of the first categorization, the second categorization, or a reference to the data structure.

Embodiments are also directed to methods, systems, and computer program products for a processor accessing a categorization of a region in memory as being logged or not logged. In these embodiments, a processor that comprises one or more processing units and a cache executes control logic that causes the processor to detect a memory access by a particular one of the one or more processing units. The memory access is targeted at a particular memory address. Based at least on detecting the memory access by the particular processing unit, the processor determines one or more of (i) whether the particular memory address is categorized as being logged or not logged, (ii) whether the particular processing unit is executing within a logging context or within a non-logging context, or (iii) a type of the memory access. Based on the determining, the processor performs one of (a) initiating a logging action based at least on one or more of (i) the particular processing unit executing within the logging context, or (ii) the particular memory address being categorized as being logged; or (b) refraining from initiating the logging action based at least on one or more of (i) the particular memory address being categorized as being not logged, or (ii) the memory access being a write.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 illustrates an example table showing a matrix of potential logging decisions.

DETAILED DESCRIPTION

At least some embodiments described herein perform a cache-based tracing based on categorizing different memory regions, such as physical memory pages, as being logged or not logged based at least on whether or not logging is enabled or disabled for a corresponding execution context. Then, when processing a memory access, a processor accesses these memory markings to determine if the memory region to which the memory access is targeted is categorized as logged or not logged. The processor uses the determination, as an input to determine whether or not to perform a logging action for the memory access.

Figure 1A:
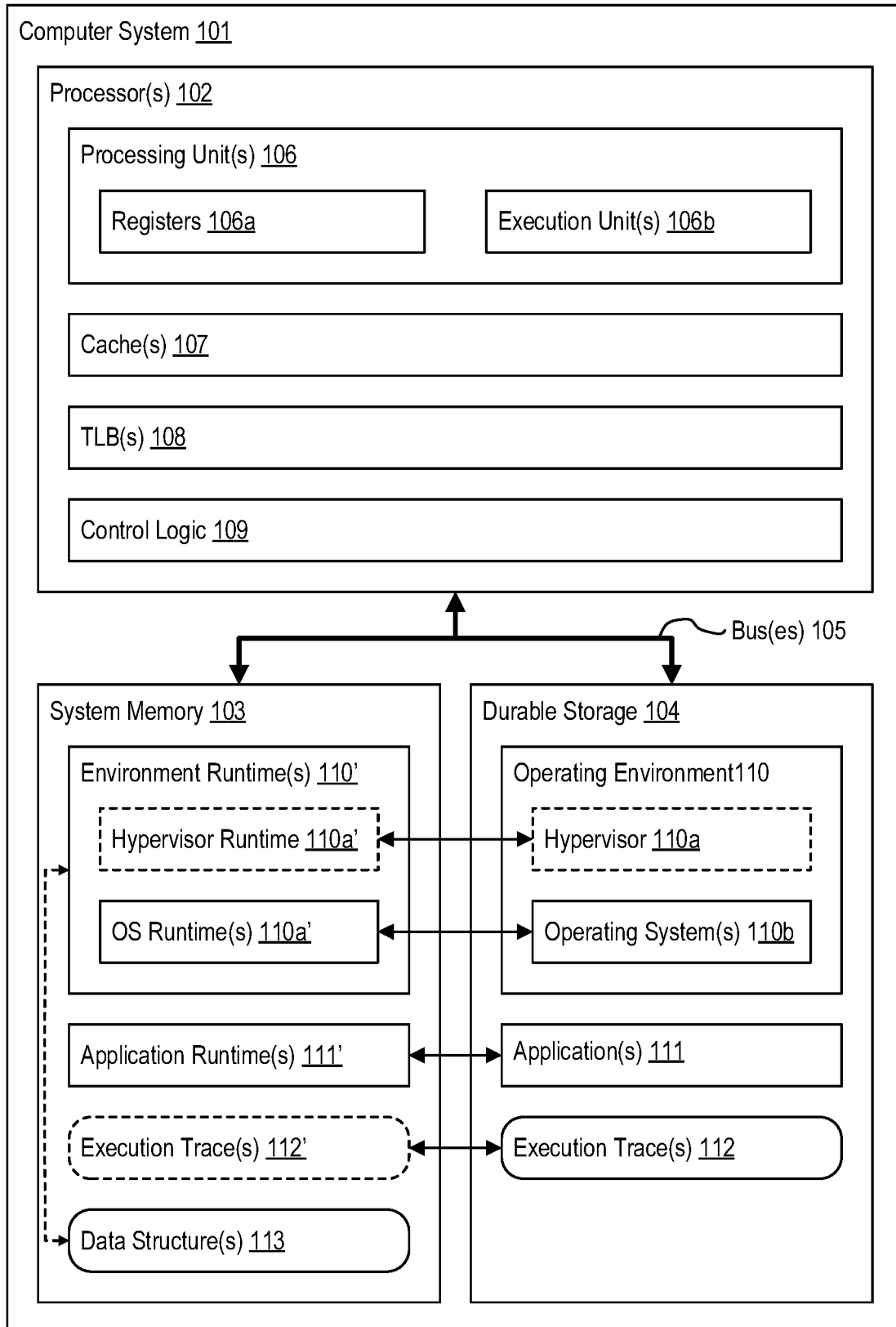
FIG. 1A illustrates an example computing environment that facilitates tracing processor execution based on categorizing regions of memory as being logged or not logged, and based on a processor making logging decisions using those categorizations.

To the accomplishment of these, and other, embodiments, FIG. 1A illustrates an example computing environment 100 that facilitates tracing processor execution based on categorizing regions of memory as being logged or not logged, and based on a processor making logging decisions using those categorizations. In particular, computing environment 100 includes a special-purpose or general-purpose computer system 101 that is configured to communicate to a processor a categorization of a region in the memory as being logged or not logged. Correspondingly, computer system 101 includes one or more processors 102 that are configured to access this categorization of the region in memory as being logged or not logged as part of trace logging. As shown, computer system 101 also includes at least system memory 103 and durable storage 104, which are communicatively coupled to each other, and to the processor(s) 102, using one or more communications buses 105.

Embodiments within the scope of the present invention can include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media (e.g., system memory 103 and/or durable storage 104) that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (not shown), and then eventually transferred to computer system RAM (e.g., system memory 103) and/or to less volatile computer storage media (e.g., durable storage 104) at the computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, machine code instructions (e.g., binaries), intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

As shown in FIG. 1A, in embodiments each processor 102 includes one or more processing unit(s) 106, one or more cache(s) 107, one or more translation lookaside buffer(s) (TLBs) 108, and control logic 109. In general, each processing unit 106 (e.g., processor core) loads and executes machine code instructions at execution units 106b. During execution of these machine code instructions, the instructions can use internal processor registers 106a as temporary storage locations, and can read and write to various locations in system memory 103 via the cache(s) 107. Each processing unit 106 in a given processor 102 executes machine code instructions that are selected from among a predefined processor instruction set architecture (ISA) of the processor 102. The particular ISA of each processor 102 can vary based on processor manufacturer and processor model. Common ISAs include the IA-64 and IA-32 architectures from INTEL, INC., the AMD64 architecture from ADVANCED MICRO DEVICES, INC., and various Advanced RISC Machine ("ARM") architectures from ARM HOLDINGS, PLC, although a great number of other ISAs exist and can be used by the present invention. In general, a machine code instruction is the smallest externally-visible (i.e., external to the processor) unit of code that is executable by a processor.

Registers 106a are hardware-based storage locations that are defined based on the ISA of the processor 102. In general, registers 106a are read from and/or written to by machine code instructions, or a processing unit 106, as those instructions execute at an execution unit 106b. Registers 106a are commonly used to store values fetched from the cache(s) 107 for use as inputs to executing machine code instructions, to store the results of executing machine code instructions, to store a program instruction count, to support maintenance of a thread stack, etc. In some embodiments, registers 106a can include "flags" that are used to signal some state change caused by executing machine code instructions (e.g., to indicate if an arithmetic operation cased a carry, a zero result, etc.). In some embodiments, registers 106a include one or more control registers (e.g., which are used to control different aspects of processor operation), and/or other processor model-specific registers (MSRs).

The cache(s) 107 temporarily cache portions of system memory 103 during execution of machine code instructions by the processing unit(s) 106. In some embodiments, cache(s) 107 include one or more "code" portions that cache portions of system memory 103 storing application code, as well as one or more "data" portions that cache portions of system memory 103 storing application runtime data. If a processing unit 106 requires data (e.g., code or application runtime data) not already stored in the cache(s) 107, then the processing unit 106 initiates a "cache miss," causing the needed data to be fetched from system memory 103 and into the cache(s) 107—while potentially replacing and "evicting" some other data already stored in the cache(s) 107 back to system memory 103. In some embodiments, the cache(s) 107 are divided into separate tiers, layers, or levels—such as layer 1 (L1), layer 2 (L2), layer 3 (L3), etc. Depending on processor implementation, one of these tiers could be part of the processor 102, itself (e.g., L1 and L2), and/or could be separate from the processor 102 (e.g., L3). Thus, in some embodiments, the cache(s) 107 comprise one of these layers (L1), while in other embodiments the cache(s) 107 comprise a plurality of these layers (e.g., L1 and L2, and even L3). In some embodiments at least one layer of the cache(s) 107 may be part of the processing unit(s) 106.

Figure 2:
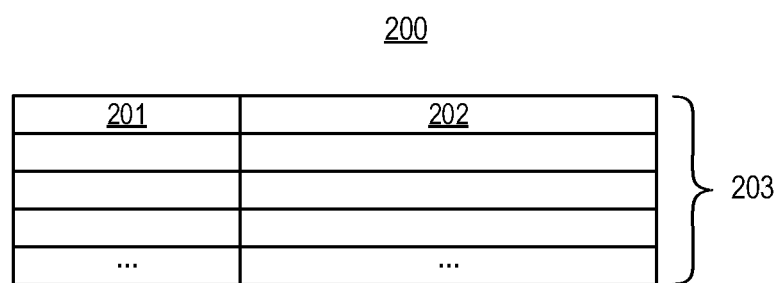
FIG. 2 illustrates an example processor cache.

In embodiments, each layer of cache(s) 107 comprises a plurality of "cache lines," each of which stores a chunk of memory from a backing store (e.g., system memory 103, or a higher-layer cache). For example, FIG. 2 illustrates an example of a processor cache 200 that includes a plurality of cache lines 203. In the example, each cache line 203 comprises at least an address portion 201 and a value portion 202. In embodiments, the address portion 201 of each cache line 203 is configured to store at least a memory address within system memory 103 to which the cache line corresponds, and the value portion 202 initially stores a data value obtained starting at that address in system memory 103. Depending on a size of the value portion 202, each cache line 203 could store data spanning a plurality of consecutive individually-addressable locations in system memory 103. The value portion 202 of each cache line 203 can be modified by processing units 106, and eventually be evicted back to system memory 103. As indicated by the ellipses within cache 200, the cache(s) 107 can include a large number of cache lines. For example, a contemporary 64-bit INTEL processor may contain individual L1 caches for each processing unit 106 comprising 512 or more cache lines. In such a cache, each cache line is typically usable to store a 64-byte (512-bit) value in reference to a 6-byte (48-bit) to 8-byte (64-bit) memory address.

In some situations, an address portion of a cache line of the cache(s) 107 stores a physical memory address, such as the actual corresponding memory address in system memory 103. In other situations, an address portion of a cache line of the cache(s) 107 stores a virtual memory address. In embodiments, a virtual memory address is an address within a virtual address space that is exposed by an operating system to a process executing at processor(s) 102. This virtual address space provides one or more abstractions to the process, such as that the process has its own exclusive memory space and/or that the process has more memory available to it than actually exists within system memory 103. Such abstractions can be used, for example, to facilitate memory isolation between different processes executing at the processor(s) 102, including isolation between user-mode processes and kernel mode processes. In embodiments, virtual to physical memory address mappings are maintained within memory page tables that are stored in system memory 103, and that are managed by an operating system and/or hypervisor (e.g., operating environment 110). In general, these memory page tables comprise a plurality of page table entries (PTEs) that map ranges (i.e., pages) of virtual memory addresses to ranges (i.e., pages) of physical memory addresses. In embodiments, each PTE stores additional attributes, or flags, about its corresponding memory pages, such as memory page permissions (e.g., read-only, writeable, etc.), page state (e.g., dirty, clean, etc.), and the like. In embodiments, the TLB(s) 108 within each processor 102 facilitate virtual addressing, and comprise a dedicated form of cache that stores recently obtained PTEs mapping virtual and physical memory pages, as obtained from the memory page tables stored in system memory 103. In some implementations, PTE are part of a multi-level hierarchy, which includes one or more page directory entries (PDEs) that support discovery of individual PTEs. If a processor 102 lacks a TLB 108, then it may lack support for virtual memory addressing.

In embodiments, control logic 109 of each processor 102 comprises microcode (i.e., executable instructions) and/or on-die gate logic that controls operation of the processor 102. In general, control logic 109 functions as an interpreter between the hardware of the processor 102 and the processor ISA exposed by the processor 102 to executing applications (e.g., operating environment 110 and application(s) 111) and controls internal operation of the processor 102. In embodiments, the control logic 109 is embodied on on-processor storage, such as ROM, EEPROM, etc. In some embodiments, this on-processor storage is writable (in which case the control logic 109 is updatable), while in other embodiments this on-processor storage is read-only (in which case the control logic 109 cannot be updated).

Although not illustrated, in some embodiments the processor(s) 102 support creation of one more secure memory enclaves that can store data and/or executable instructions. For example, in embodiments the processor(s) 102 provide machine code instructions (e.g., INTEL SOFTWARE GUARD EXTENSIONS (SGX)) that allow user-level as well as operating system code to define private regions of memory, called enclaves, whose contents are protected and unable to be either read or saved by any process outside the enclave itself—including processes running at higher privilege levels. In embodiments, a processor 102 supporting enclaves encrypts a portion of system memory 103; this portion of memory is then decrypted only within the processor 102 itself, and even then, only for code and data running from within the enclave.

The durable storage 104 stores computer-executable instructions and/or data structures representing executable software components. Correspondingly, during execution of these software components at the processor(s) 102, one or more portions of these computer-executable instructions and/or data structures are loaded into system memory 103.

For example, the durable storage 104 is illustrated as storing computer-executable instructions and/or data structures corresponding to an operating environment 110 and one or more application(s) 111. Correspondingly, the system memory 103 is shown as storing one or more operating environment runtime(s) 110' (e.g., machine code instructions and/or runtime data supporting execution of the operating environment 110), and as storing one or more application runtime(s) 111' (e.g., machine code instructions and/or runtime data supporting execution of one or more of application(s) 111). The system memory 103 and durable storage 104 can also store other data, such as one or more replayable execution trace(s) (i.e., execution trace(s) 112' stored in system memory 103 and/or execution trace(s) 112 stored in durable storage 104) and one or more data structure(s) 113 that support facilitate communication between operating environment 110 and control logic 109 during tracing of application(s) 111.

In FIG. 1A, operating environment 110 is shown as potentially including a hypervisor 110*a*, and as including one or more operating system(s) 110*b*. Correspondingly, the operating environment runtime(s) 110' is shown as potentially including a hypervisor runtime 110*a'*, and as including one or more operating system runtime(s) 110*a'*. For example, in some embodiments, the operating environment 110 comprises the hypervisor 110*a* executing directly on the hardware (e.g., processor(s) 102, system memory 103, and durable storage 104) of computer system 101, and one or more of the operating system(s) 110*b* executing on top of the hypervisor 110*a*. In other embodiments, however, the operating environment 110 comprises an operating system 110*b* executing directly on the hardware (e.g., processor(s) 102, system memory 103, and durable storage 104) of computer system 101.

In embodiments, the operating environment 110 and the control logic 109 cooperate to record one or more replayable execution trace(s) 112/112' of code execution at the processor(s) 102 based at least on using memory markings as logging cues for processor-based execution tracing. More particularly, in embodiments, the operating environment 110 and the control logic 109 cooperate to record replayable execution trace(s) 112/112' based on categorizing different memory regions, such as physical memory pages in system memory 103, as being logged or not logged, which categorizations are based in turn on whether or not logging is enabled or disabled for a corresponding execution context. In embodiments, an execution context corresponds to at least one of a process executing on top of an operating system 110*b*, an operating system 110*b*, a virtual machine/memory partition created by the hypervisor 110*a*, an enclave, a nested hypervisor, and the like. In embodiments, using memory markings as logging cues for processor-based execution tracing is based at least on (i) the operating environment 110 maintaining one or more data structure(s) 113 that categorize different memory regions as being logged and not logged, and on (ii) the processor(s) 102 using these data structure(s) 113 to make logging decisions during tracing.

In embodiments, tracing techniques utilized by the operating environment 110 and control logic 109 to record replayable execution traces 112/112' are based at least on the processor(s) 102 recording influxes to their cache(s) 107 during code execution. In embodiments, each replayable execution trace 112/112' comprises a "bit-accurate" record of execution of a corresponding context (e.g., process, operating system, virtual machine, enclave, hypervisor, etc.) as that context executed at the processor(s) 102. As used herein, a replayable execution trace is a "bit accurate" record of that context's execution activity. This bit-accurate record enables machine code instructions that were previously executed as part of the context at the processing unit(s) 106 to be replayed later, such that, during replay, these machine code instructions are re-executed in the same order and consume the same data that they did during trace recording. While a variety of possible bit-accurate tracing approaches are possible, as mentioned, the embodiments herein record a bit-accurate execution trace based on logging at least some of the influxes to cache(s) 107 during execution of a context. By logging at least some of these influxes during execution of the context, a replayable execution trace 112/112' of that context captures at least some of the memory reads that were performed by the machine code instructions that executed as part of the context.

The cache-based tracing techniques used by the embodiments herein are built upon an observation that each processor 102 (including its the cache(s) 107) form a semi- or quasi-closed system. For example, once portions of data for an executing context (i.e., machine code instructions and runtime data) are loaded into a processor's cache(s) 107, a processing unit 106 can continue executing that context—without any other external input—as a semi- or quasi-closed system for bursts of time. In particular, once the cache(s) 107 are loaded with machine code instructions and runtime data, the execution unit 106*b* can load and execute those machine code instructions from the code portion(s) of the cache(s) 107, using runtime data stored in the data portion(s) of the cache(s) 107 as input to those machine code instructions, and using the registers 106*a*. So long as the data (i.e., machine code instructions and runtime data) that are needed for the processor 102 to execute that thread exists within the cache(s) 107, the processor 102 can continue executing that context without further external input.

When a processing unit 106 needs some influx of data (e.g., because a machine code instruction it is executing, will execute, or may execute accesses code or runtime data not already in the cache(s) 107), the processor 102 may execute a "cache miss," importing data into the cache(s) 107 from the system memory 103. For example, if a data cache miss occurs when a processing unit 106 executes a machine code instruction that performs a memory operation on a memory address within application runtime 111' storing runtime data, the processor 102 imports runtime data from that memory address in the system memory 103 to one of the cache lines of the data portion of the cache(s) 107. Similarly, if a code cache miss occurs when a processing unit 106 tries to fetch a machine code instruction from a memory address within application runtime 111' storing application code, the processor 102 imports code data from that memory address in system memory 103 to one of the cache lines of the code portion of the cache(s) 107. The processing unit 106 then continues execution using the newly-imported data, until new data is needed.

In embodiments, each processor 102 is enabled to record a bit-accurate representation of execution of a context executing at the processor 102, by recording, into a trace data stream corresponding the context, sufficient data to be able to reproduce the influxes of information into the processor's cache(s) 107 as the processor's processing units 106 execute that context's code. For example, some approaches to recording these influxes operate on a per-processing-unit basis. These approaches involve recording, for each processing unit that is being traced, at least a subset of cache misses within the cache(s) 107, along with a time during execution at which each piece of data was brought into the cache(s) 107 (e.g., using a count of instructions executed or some other counter). In some embodiments, these approaches involve also recording, for each processing unit that is being traced, any un-cached reads (i.e., reads from hardware components and un-cacheable memory that bypass the cache(s) 107) caused by that processing unit's activity, as well as the side-effects of having executed any non-deterministic processor instructions (e.g., one or more values of register(s) 106a after having executed a non-deterministic processor instruction).

Figure 3:
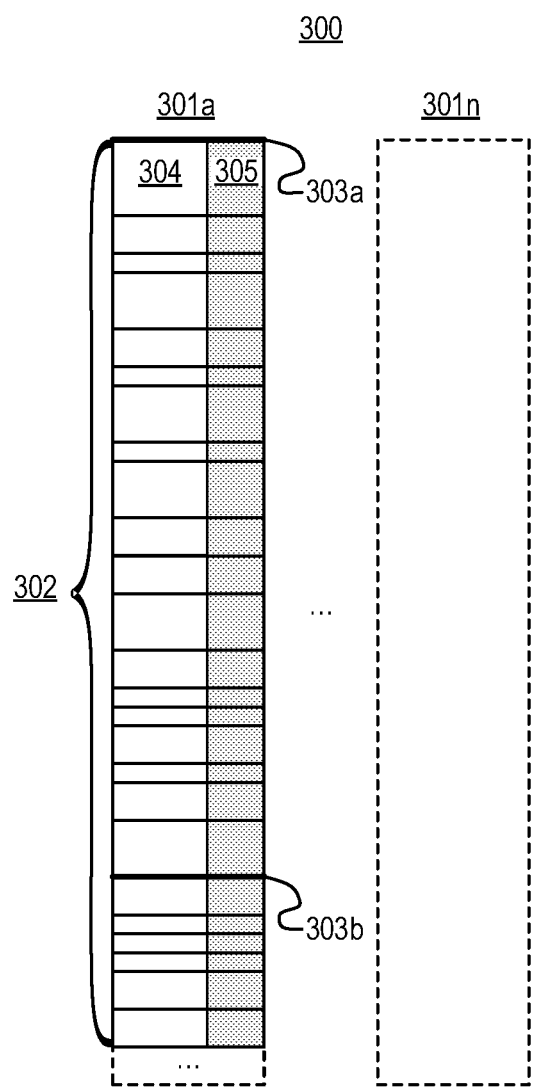
FIG. 3 illustrates an example of an execution trace.

FIG. 3 illustrates an example of an execution trace (e.g., one of execution trace(s) 112/112'). In particular, FIG. 3 illustrates an execution trace 300 that includes a plurality of data streams 301 (i.e., data streams 301a-301n). In embodiments, each data stream 301 represents execution of a different context, such as a different thread that executed from the code of an application 111. In an example, data stream 301a records execution of a first thread of an application 111, while data stream 301n records an nth thread of the application 111. As shown, data stream 301a comprises a plurality of data packets 302. Since the particular data logged in each data packet 302 can vary, these data packets are shown as having varying sizes. In embodiments, when using time-travel debugging technologies, a data packet 302 records the inputs (e.g., register values, memory values, etc.) to one or more executable instructions that executed as part of this first thread of the application 111. In embodiments, memory values are obtained as influxes to cache(s) 107 and/or as uncached reads. In embodiments, data stream 301a also includes one or more key frames 303 (e.g., key frames 303a and 303b) that each records sufficient information, such as a snapshot of register and/or memory values, that enables the prior execution of the thread to be replayed, starting at the point of the key frame and proceeding forward.

In embodiments, an execution trace also includes the actual code that was executed as part of an application 111. Thus, in FIG. 3, each data packet 302 is shown as including a non-shaded data inputs portion 304 and a shaded code portion 305. In embodiments, the code portion 305 of each data packet 302, if present, includes the executable instructions that executed based on the corresponding data inputs. In other embodiments, however, an execution trace omits the actual code that was executed, instead relying on having separate access to the code of the application 111 (e.g., from durable storage 104). In these other embodiments, each data packet specifies an address or offset to the appropriate executable instruction(s) in an application binary image. Although not shown, it is possible that the execution trace 300 includes a data stream 301 that stores one or more of the outputs of code execution. It is noted that used of different data input and code portions of a data packet is for illustrative purposes only, and that the same data could be stored in a variety of manners, such as by the use of multiple data packets.

If there are multiple data streams 301, in embodiments these data streams include sequencing events. Each sequencing event records the occurrence of an event that is orderable across different execution contexts, such as threads. In one example, sequencing events correspond to interactions between the threads, such as accesses to memory that is shared by the threads. Thus, for instance, if a first thread that is traced into a first data stream (e.g., 301a) writes to a synchronization variable, a first sequencing event is recorded into that data stream (e.g., 301a). Later, if a second thread that is traced into a second data stream (e.g., 301b) reads from that synchronization variable, a second sequencing event is recorded into that data stream (e.g., 301b). These sequencing events are inherently ordered. For example, in some embodiments each sequencing event is associated with a monotonically incrementing value, with the monotonically incrementing values defining a total order among the sequencing events. In one example, a first sequencing event recorded into a first data stream is given a value of one, a second sequencing event recorded into a second data stream is given a value of two, etc.

As mentioned, some prior tracing approaches leveraged modifications to a processor cache that track whether each cache line can be considered to have been already logged by at least one processing unit. In various implementations, these cache modifications extend the one or more of processor's caches to include additional "logging" bits (or flags), or reserve one or more cache lines for logging bit use. These logging bits enable a processor to identify, for each cache line, one or more processing units that consumed/ logged the cache line. Use of logging bits can enable the processor's control logic to avoid re-logging cache line influxes for one execution context after a processing unit transitions to another execution context (e.g., another thread, another virtual machine, kernel mode, etc.) if that other context did not modify the cache line. Additionally, use of logging bits can enable a trace entry for one context to reference data already logged on behalf of another context. However, as mentioned, use of logging bits in a cache adds physical size and complexity to a processor's IC die, and introduces logic to manage tracking bits into critical code execution paths.

Figure 1B:
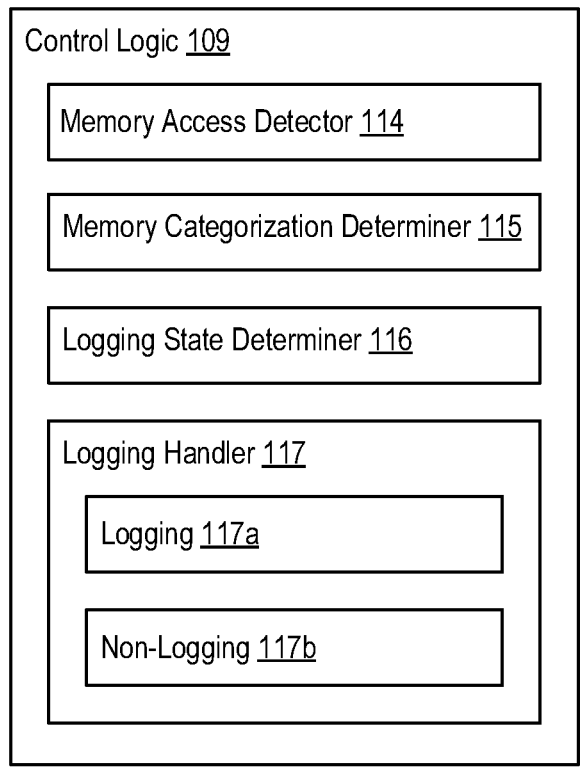
FIG. 1B illustrates an example of processor control logic that makes logging decisions based on categorizations of regions of memory as being logged or not logged.
Figure 1C:
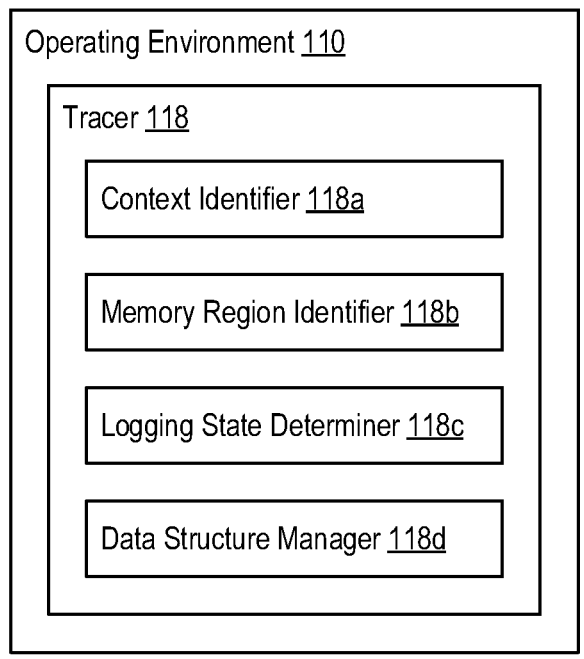
FIG. 1C illustrates an example an operating environment that categorizes regions of memory as being logged or not logged.

As an alternative to cache-based logging bits, it was mentioned that, in the embodiments described herein, the operating environment 110 and the control logic 109 cooperate to record one or more replayable execution trace(s) 112/112' based at least on using memory markings as logging cues for processor-based execution tracing. As discussed, in embodiments, the operating environment 110 and the control logic 109 cooperate to record replayable execution trace(s) 112/112' based on categorizing different memory regions, such as physical memory pages in system memory 103, as being logged or not logged, which categorizations are based in turn on whether or not logging is enabled or disabled for a corresponding execution context. As discussed, using memory markings as logging cues for processor-based execution tracing is based at least on (i) the operating environment 110 maintaining one or more data structure(s) 113 that categorize different memory regions as being logged and not logged, and on (ii) the processor(s) 102 using these data structure(s) 113 to make logging decisions during tracing To demonstrate some embodiments of how the operating environment 110 and the control logic 109 accomplish the foregoing, FIG. 1B illustrates additional detail of control logic 109, including components (e.g., memory access detector 114, memory categorization determiner 115, logging state determiner 116, logging handler 117, etc.) that embodiments of the control logic 109 uses when making logging decisions based on categorizations of regions of memory as being logged or not logged. Additionally, FIG. 1C illustrates additional detail of operating environment 110, including components of a tracer 118 (e.g., context identifier 118a, memory region identifier 118b, logging state determiner 118c, data structure manager 118d, etc.) that embodiments of the operating environment 110 uses in order to categorize regions of memory as being logged or not logged. The depicted components of control logic 109 and operating environment 110, together with any sub-components, represent various functions that the control logic 109 and/or the operating environment 110 might implement or utilize in accordance with various embodiments described herein. It will be appreciated, however, that the depicted components—including their identity, sub-components, and arrangement—are presented merely as an aid in describing various embodiments of the control logic 109 and/or the operating environment 110 described herein, and that these components are non-limiting to how software and/or hardware might implement various embodiments of the control logic 109 and/or the operating environment 110 described herein, or of the particular functionality thereof.

As a general introduction to operating environment 110, a hypervisor 110*a* and/or an operating system 110*b* configures the system memory 103 to support execution of a plurality of execution contexts at the processor(s) 102. In various embodiments, this includes the operating environment 110 configuring the system memory 103 to support memory spaces corresponding to one or more processes (e.g., corresponding to application(s) 111), corresponding to one or more of operating systems 110*b*, corresponding to one or more memory partitions (e.g., created by hypervisor 110*a*, each of which may execute at least one of operating systems 110*b*), corresponding to an enclave, corresponding to a nested hypervisor, etc. In embodiments, configuring the system memory 103 to support execution of a plurality of execution contexts comprises creating and configuring one or more data structures, such as one or more PTEs, one or more PDEs, one or more second level address tables (SLATs), etc. that map (or support mapping of) one or more physical memory pages in the system memory 103 to one or more virtual memory pages within a given context's corresponding memory space.

The tracer 118 enhances the hypervisor 110*a* and/or the operating system 110*b* to support tracing execution of one or more execution contexts at the processor(s) 102, including creating and/or maintaining data structures 113 for use by control logic 109 to determine if the target of a given memory access has been categorized as being logged or not logged, and to use this categorization as a cue to determine whether or not the memory access should be logged into an execution trace 112/112'. In embodiments, the tracer 118 executes, at least in part, as a component of the hypervisor 110*a*, and/or as a kernel-mode component of at least one of operating system(s) 110*b*. In other embodiments the tracer 118 executes, at least in part, as a user-mode component of at least one of operating system(s) 110*b*. In embodiments, the tracer 118 has a plurality of portions that execute within the context of two or more of (i) user-mode of at least one of operating system(s) 110*b*, (ii) kernel mode of at least one of operating system(s) 110*b*, or (iii) the hypervisor 110*a*. In some embodiments, tracer 118 is distributed as a component of the hypervisor 110*a* and/or at least one of operating system(s) 110*b*, while in other embodiments tracer 118 is provided (e.g., by an application 111) as an extension to the hypervisor 110*a* and/or the operating system(s) 110*b* (e.g., as an operating system driver, kernel extension, kernel module, hypervisor module or extension, etc.). Thus, even though tracer 118 is illustrated executing (at least in part) as a component of operating environment 110, tracer 118 could actually be provided to operating environment 110 by a third-party.

A context identifier 118*a* identifies one or more execution contexts configured by operating environment 110 for execution at the processor(s) 102. In an example, the context identifier 118*a* identifies execution context(s) corresponding to one (or more) of a process (e.g., corresponding to application(s) 111), an operating system (e.g., corresponding to operating system(s) 110*b*), a memory partition (e.g., created by hypervisor 110*a*), an enclave, a nested hypervisor, and the like. In embodiments, the context identifier 118*a* operates to identify a given execution context at creation of the execution context, and/or at some other time after creation of the execution context.

A memory region identifier 118*b* identifies one or more regions of system memory 103 that are mapped to the memory space of an execution context identified by the context identifier 118*a*. In some embodiments, the memory region identifier 118*b* identifies all regions of the system memory 103 that are mapped to the memory space of the identified context, while in other embodiments the memory region identifier 118*b* identifies less than all those regions. In some embodiments, the memory region identifier 118*b* identifies a plurality of consecutive regions within system memory 103 and/or within the memory space of the identified context, while in other embodiment the memory region identifier 118*b* identifies a plurality of non-consecutive regions within system memory 103 and/or within the memory space of the identified context. In some embodiments, the memory region identifier 118*b* identifies regions of system memory 103 that correspond to physical memory pages, while in other embodiments the memory region identifier 118*b* identifies other memory region sizes—such as a cache line size, or some arbitrary size of memory.

A logging state determiner 118*c* determines a logging state for an execution context identified by the context identifier 118*a*. In embodiments, each execution context is assigned at least one of a logging state (in which execution tracing is enabled for the context), or a non-logging state (in which execution tracing is not enabled for the context). In some embodiments, an execution context is assigned the non-logging state at creation of the context, and it is only assigned the logging state upon an express request (e.g., by tracer 118 or some component related thereto). In embodiments, some execution contexts transition between the logging state and the non-logging state number of times during their existence.

A data structure manager 118*d* configures data structures 113 with a cue of which memory region(s) are to be logged, and which memory region(s) are not to be logged, by the processor(s) 102. Examples of different types of data structures 113 are described later. In some embodiments, upon creation of the data structures 113 by the data structure manager 118*d*, or by some other component (e.g., a hypervisor 110*a* and/or an operating system 110*b*), the data structures 113 default to categorizing memory regions as being not logged. In these embodiments, the categorization of these memory regions is later changed by the data structure manager 118*d*. In other embodiments, however, memory region categorizations are affirmatively made by the data structure manager 118*d* based on the logging state of a corresponding execution context. In embodiments, the data structure manager 118*d* communicates at least a portion of the data structures 113 to the processor(s) 102. Examples of ways in which the data structure manager 118*d* communicates with the processor(s) 102 are described later.

As a general introduction to control logic 109, a memory access detector 114 detects when a processing unit 106 executing an execution context makes an access to a target memory address. Based at least on the memory access having been detected by the memory access detector 114, a memory categorization determiner 115 utilizes information stored in data structures 113 to determine whether a memory region corresponding to the target memory address is categorized as being logged or not logged, and a logging state determiner 116 determines whether the execution context being executed by the processing unit 106 is in a logging or a non-logging state. In some embodiments, the memory access detector 114 also determines a type of the memory access, such as a read (load) type or a write (store) type. Based on one or more of (i) the categorization of the memory region corresponding to the target memory address, (ii) the logging state of the execution context, or (iii) a type of the memory access, a logging handler 117 either invokes logging logic 117a to perform a logging action for the memory access, or invokes non-logging logic 117b to refrain from performing the logging action for the memory access.

Figure 5:
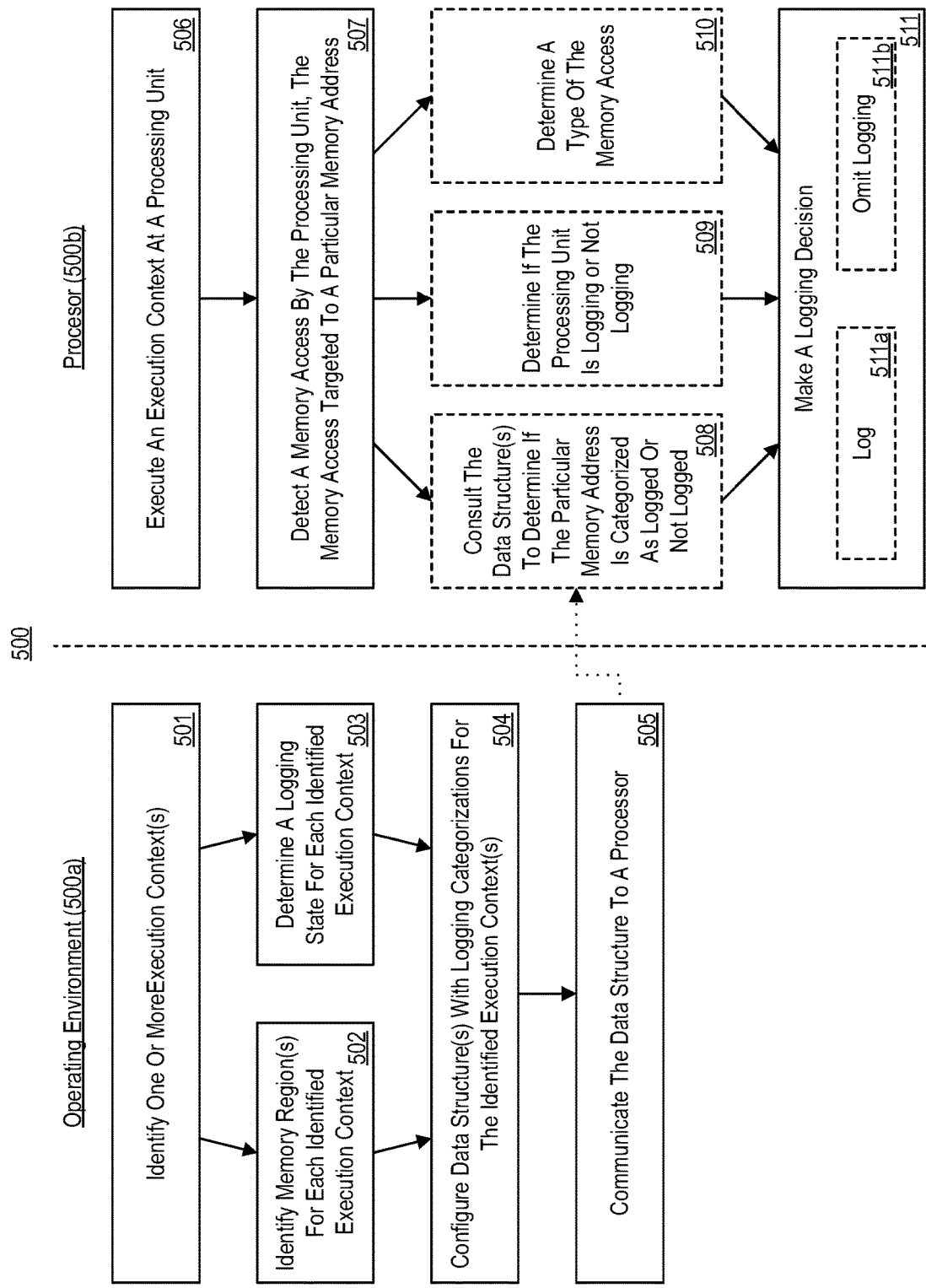
FIG. 5 illustrates a flow chart of an example method for a computer system to communicate to a processor a categorization of a region in the memory as being logged or not logged, and for a processor to access a categorization of a region in memory as being logged or not logged as part of trace logging.

Further operation of the control logic 109 and operating environment 110 are now described in greater detail, primarily in connection with FIG. 5, which illustrates a flow chart of an example method 500 for a computer system to communicate to a processor a categorization of a region in the memory as being logged or not logged, and for a processor to make a logging decision based on accessing a categorization of a region in memory as being logged or not logged as part of trace logging. The following discussion refers to a number of methods and method acts. Although the method acts may be discussed in a certain order, or may be illustrated in a flow chart as occurring in a particular order, no particular ordering is required unless specifically stated, or required because an act is specifically described as being dependent on another act being completed prior to the act being performed.

Referring to FIG. 5, method 500 includes acts 501-505 that are performed by an operating environment (e.g., hypervisor 110a and/or operating system 110b), and acts 506-511 that are performed by a processor (e.g., processor 102 based on control logic 109). As such, method 500 can be viewed as either a single method implemented and performed by computer system 101 (which includes both the operating environment 110 and the processor 102), or as separate methods—one (i.e., method 500a, comprising acts 501-505) that is implemented by operating environment 110 and that is performed in connection with execution of operating environment 110, and another (i.e., method 500b, comprising acts 506-511) that is separately implemented by processor 102 and that is performed by operation of processor 102.

Referring initially to operating environment 110, method 500a (e.g., performed by operation of the operating environment 110) includes an act of 501 of identifying one or more execution context(s). In some embodiments, act 501 comprises identifying a first context that is configured for execution at the processor. In an example, the context identifier 118a identifies an execution context configured for execution at processor(s) 102. In embodiments, in act 501 the context identifier 118a identifies first context that corresponds to at least one of a process, an operating system, a virtual machine, a memory partition, an enclave, or a hypervisor.

As shown, based at least on having performed act 501, method 500a proceeds to an act 502 of identifying memory region(s) for each identified execution context, and an act 503 of determining a logging state for each identified execution context. In FIG. 5, acts 502 and 503 are illustrated as being performed in parallel, though it will be appreciated that embodiments could alternatively perform these acts 502 and 503 serially (in either order).

In some embodiments, act 502 (i.e., of identifying memory region(s) for each identified execution context) comprises identifying one or more first region(s) within the memory, the first region(s) corresponding to at least a portion of a first memory space of the first context. In an example, the memory region identifier 118b identifies one or more regions in system memory 103 that correspond to a memory space of an execution context identified in act 501 (e.g., a virtual memory space configured for a user mode-process by an operating system 110b, a memory space corresponding to a kernel mode of an operating system 110b, a virtual memory space configured for a virtual memory partition by a hypervisor 110a, etc.).

Figure 4A:
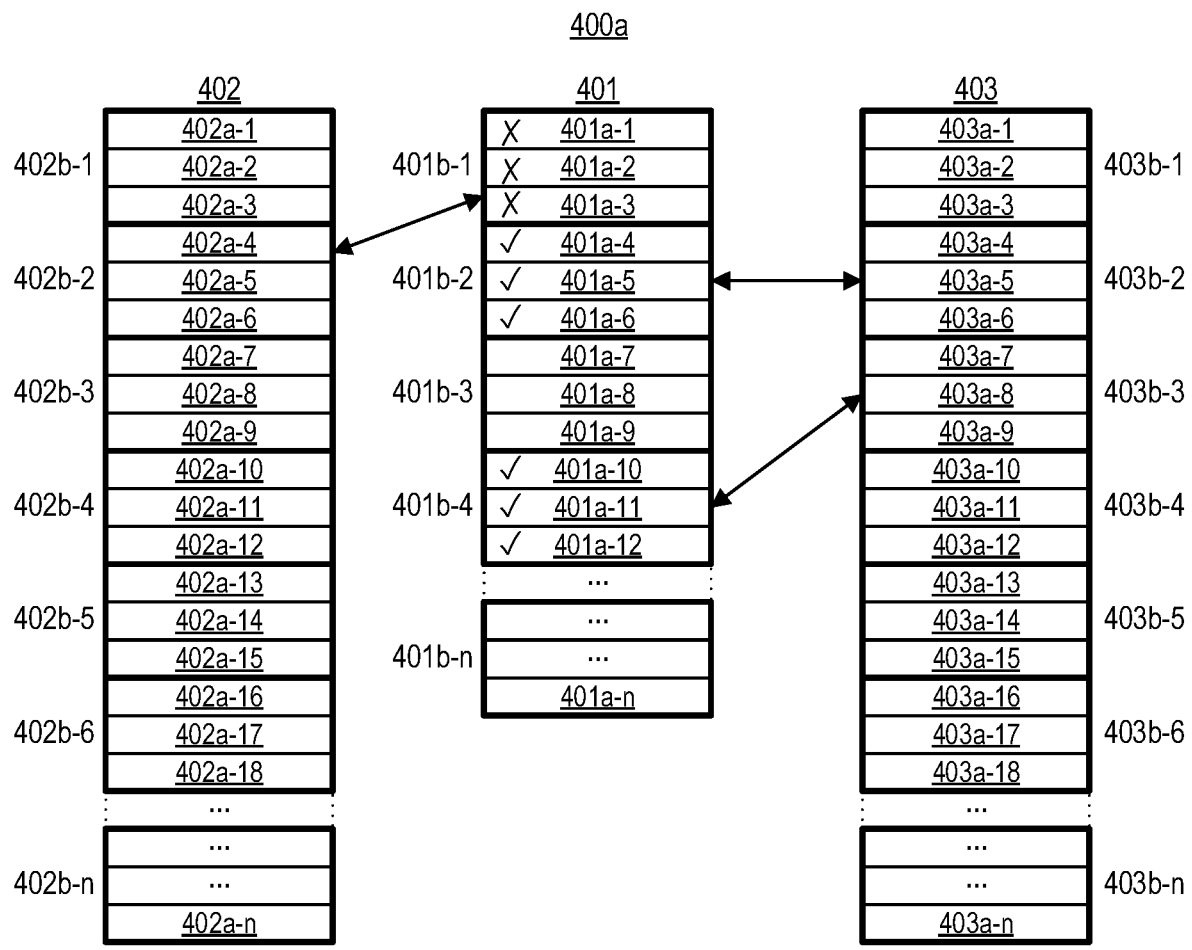
FIGS. 4A and 4B illustrate examples of physical to virtual memory address space mappings.

In order to demonstrate how the memory region identifier 118b, identifies region(s) in the system memory 103 that correspond to an identified execution context, FIG. 4A illustrates an example 400a of physical to virtual memory address space mappings. In particular, example 400a illustrates a physical address space 401, such as corresponding to physical addresses in system memory 103. In addition, example 400a illustrates two virtual address spaces 402 and 403. Each address space is shown as including a plurality of addressable memory locations (i.e., physical memory locations 401a-1 to 401a-n for physical address space 401, virtual memory locations 402a-1 to 402a-n for virtual address space 402, and virtual memory locations 403a-1 to 403a-n for virtual address space 403). In addition, in each address space, these addressable memory locations are shown as being arranged into different memory pages (i.e., physical memory pages 401b-1 to 401b-n for physical address space 401, virtual memory pages 402b-1 to 402b-n for virtual address space 402, and virtual memory pages 403b-1 to 403b-n for virtual address space 403). While address spaces 401-403 are illustrated as comprising only a small number of addressable memory locations, the ellipses within each of address spaces 401, 402, and 403 indicate that these address spaces can include many more addressable memory locations than those illustrated. In addition, while each memory page is shown for ease in illustration as including only three addressable memory locations, it will be appreciated that memory pages can have various sizes depending on implementation, and that they typically include many more than three addressable memory locations. Notably, physical address space 401 is shown in example 400a as being smaller that virtual address spaces 402 and 403, to emphasize that physical and virtual address spaces need not be equal in size, and that the amount of available physical memory in a computer system is frequently smaller than the virtual memory space presented to each executing process.

In example 400a, virtual address space 403 represents the first memory space of the first context that was identified in act 501. As indicated by a first arrow between physical memory page 401b-2 in physical address space 401 and virtual memory page 403b-2 in virtual address space 403, there is a first region of physical address space 401 (i.e., physical memory locations 401a-4 to 401a-6) that maps to a first region of virtual address space 403 (i.e., virtual memory locations 403a-4 to 403a-6). In addition as indicated by a second arrow between physical memory page 401b-3 in physical address space 401 and virtual memory page 403b-4 in virtual address space 403, there is a second region of physical address space 401 (i.e., physical memory locations 401a-10 to 401a-12) that maps to a second region of virtual address space 403 (i.e., virtual memory locations 403a-7 to 403a-7). Thus, in this example, the memory region identifier 118b could identify physical memory pages 401b-2 and 401b-4 as being the one or more first region(s) within system memory 103 corresponding to at least a portion of the first memory space of the first context.

In some embodiments, act 503 (i.e., of determining a logging state for each identified execution context) comprises determining that the first context is assigned a logging state. In an example, the logging state determiner 118*c* determines that the first executable context (i.e., corresponding to virtual address space 403) has been assigned a logging state. For example, based on user input, or based on a policy, the tracer 118 (or some component related thereto) may have determined that the first context is to be traced during its execution, and created some indication (e.g., in system memory 103, in durable storage 104, in a register 106*a*, etc.) that the first context is assigned the logging state. Based on this indication, the logging state determiner 118*c* determines that the first context is assigned the logging state.

Method 500*a* also includes an act of 504 of configuring data structure(s) with logging categorizations for the execution context(s). In some embodiments, act 503 comprises, based on the determination, configuring a data structure with a first categorization of the one or more first region(s) as being logged. In an example, the data structure manager 118*d* modifies data structure(s) 113 to indicate that the first memory region(s) identified in act 502 are being logged. Referring to FIG. 4A, there is a check-mark (✓) corresponding to each of physical memory locations 401*a*-4 to 401*a*-6 and 401*a*-10 to 401*a*-12, indicating that those physical memory locations are within region(s) of the system memory 103 that are configured in the data structure(s) 113 as being logged.

Figure 4B:
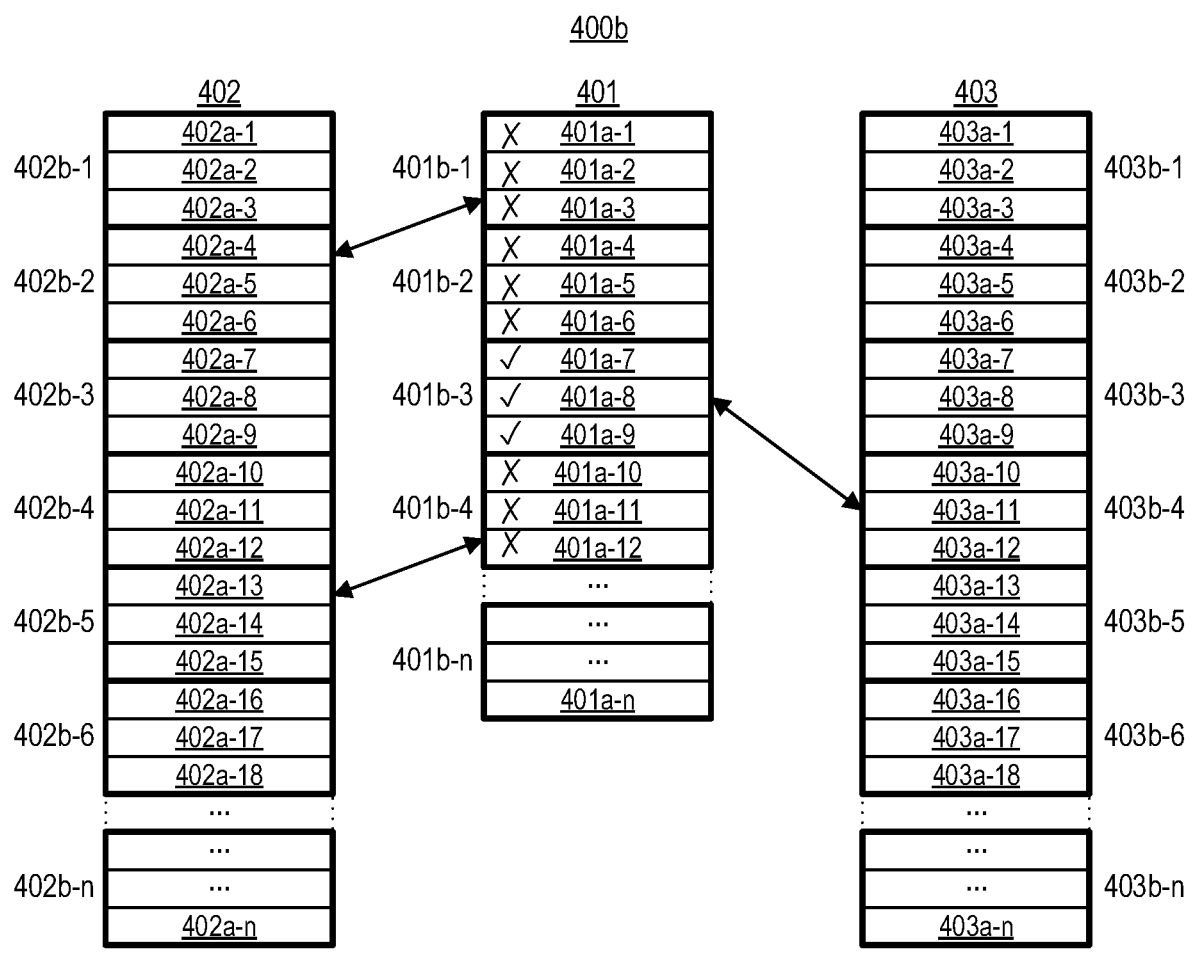

In addition, in some embodiments of act 503 the data structure also includes a second categorization of one or more second region(s) within the memory as being not logged, the one or more second region(s) corresponding to at least a portion of a second memory space of second context that is configured for execution at the processor and that is assigned a non-logging state. In embodiments, this second context corresponds to at least one of a process, an operating system, a virtual machine, a memory partition, an enclave, or a hypervisor. The second memory space of this second context is represented in FIG. 4A by virtual address space 402. As indicated by a first arrow between physical memory page 401*b*-1 in physical address space 401 and virtual memory page 402*b*-2 in virtual address space 402, there is a first region of physical address space 401 (i.e., physical memory locations 401*a*-1 to 401*a*-3) that maps to a first region of virtual address space 402 (i.e., virtual memory locations 402*a*-4 to 402*a*-6). In FIG. 4B, there is an X-mark (X) corresponding to each of physical memory locations 401*a*-1 to 401*a*-3, indicating that those physical memory locations are within region(s) of the system memory 103 that are configured in the data structure(s) 113 as being not logged. In some embodiments, the categorization of physical memory locations 401*a*-1 to 401*a*-3 as being not logged is made by prior operation of method 500*a* (i.e., in which acts 501-503 operated in relation to the second context, and the second context was in a non-logging state). In other embodiments, the categorization of physical memory locations 401*a*-1 to 401*a*-3 as being not logged is a default categorization within the data structure(s) 113. In these other embodiments, unless an execution context has ever been assigned the logging state, any physical memory ranges associated with that execution context are categorized as being not-logged.

The exact form of data structures(s) 113 varies depending on embodiment. Although the data structures 113 are depicted within system memory 103, in some embodiments they are at least partially stored in one or more of registers 106*a* or TLB(s) 108. In addition, although the data structures(s) 113 are depicted as being separate from operating environment runtime 110', it will be appreciated that in some embodiments the data structures(s) 113 could be part of operating environment runtime 110', at least in part (e.g., as indicated in FIG. 1A by an arrow between data structures(s) 113 and operating environment runtime 110').

In some embodiments, the data structures(s) 113 comprise memory page tables, and the data structure manager 118*d* modifies one or more PTEs and/or one or more PDE's within these page tables to indicate whether or not the memory addresses within corresponding memory page(s) are categorized as logged or not logged. In some embodiments, the data structure manager 118*d* indicates a categorization of logged or not logged using one or more flag bits within a PTE and/or a PDE. In some embodiments, the operating environment 110 extends PTEs and/or PDEs to include new flag bit(s) for signaling logging status, and the data structure manager 118*d* modifies these new flag bit(s) accordingly. Some embodiments utilize a PTE to provide a categorization for all memory page(s) covered by that PTE, and utilize a PDE to provide at least a default categorization for all PTEs covered by that PDE. In embodiments, a PTE can override a default categorization of a corresponding PDE. For example, in some embodiments of act 504, configuring the data structure with the first categorization of the first region as being logged comprises configuring one or more first PTE or PDE flags corresponding to a first memory page in the memory that overlaps with the first region in order to categorize the first memory page as being logged. In these embodiments, the second categorization of the second region within the memory as being not logged comprises one or more second PTE or PDF flags corresponding to a second memory page in the memory that overlaps with the second region categorizing the second memory page as being not logged.

In some embodiments, the data structures(s) 113 comprise one or more bitmaps, and the data structure manager 118*d* modifies one or more bits in the bitmap(s) to indicate whether or not the memory addresses within one or more memory regions corresponding to those bit(s) are categorized as logged or not logged. The particular amount of memory that corresponds to each bit can vary depending on implementation. In various embodiments, each bit corresponds to one of a memory page, a cache line, or some arbitrary size of memory. In embodiments, if each bit corresponds to some arbitrary size of memory, the data structure manager 118*d* stores this data size within at least one of registers 106*a*. Thus, in some embodiments of act 504, configuring the data structure with the first categorization of the first region as being logged comprises configuring one or more first bits in a bitmap in order to categorize the first region as being logged. In these embodiments, the second categorization of the second region within the memory as being not logged comprises one or more second bits in the bitmap categorizing the second region as being not logged.

In some embodiments, at least a portion of the data structures(s) 113, or pointers thereto, are stored within registers 106*a*. In one embodiment, the data structure manager 118*d* stores an identity of one or more memory regions (e.g., corresponding to region(s) that are categorized as logged) within one or more of registers 106*a*. For instance, in some embodiments the data structure manager 118*d* stores an identity of a memory region within a breakpoint comparator register (e.g., in reference to a beginning memory address and an offset, such as by reference to a data size, and ending memory address, etc.). In another embodiment, the data structure manager 118*d* stores a pointer to the previously-discussed bitmap within one or more of registers 106*a* to enable the processor 102 to locate the bitmap within system memory 103. In another embodiment, the data structure manager 118*d* stores a size of the data referenced by each bit on the bitmap within one or more of registers 106*a* to enable the processor 102 to identify which memory region(s) correspond to each bit in the bitmap. Thus, in some embodiments of act 504, configuring the data structure with the first categorization of the first region as being logged comprises configuring a register in the processor with at least one of a base memory address in the memory or a memory size, wherein at least one of the base memory address or the memory size identify at least one of a reference to the bitmap or the first region. In embodiments, the data structure manager 118*d* stores at least a portion of the data structures(s) 113, or pointers thereto, within a processor-based memory protection unit (MPU). Some embodiments utilize an MPU in addition to use of registers 106*a*, while other embodiments utilize an MPU as an alternative to use of registers 106*a*.

As will be appreciated by one of ordinary skill in the art, in many environments the physical-to-virtual mappings for an execution context can change frequently and dynamically during the lifecycle of the execution context. As such, method 500*a* can operate to dynamically update the data structure(s) 113 as these mappings change. For example, FIG. 4B shows an additional example 400*b* of the physical to virtual memory address space mappings of example 400*b*, but at a subsequent time in which the prior mappings between (i) physical memory page 401*b*-2 in physical address space 401 and virtual memory page 403*b*-2 in virtual address space 403 and (ii) physical memory page 401*b*-4 in physical address space 401 and virtual memory page 403*b*-3 in virtual address space 403 have been removed (e.g., due to physical memory pages 401*b*-2 and 401*b*-4 being paged out to disk), in which a new mapping between physical memory page 401*b*-3 in physical address space 401 and virtual memory page 403*b*-4 in virtual address space 403 has been added, and in which a new mapping between physical memory page 401*b*-4 in physical address space 401 and virtual memory page 402*b*-5 in virtual address space 402 has been added. In addition, example 400*b* shows that physical memory page 401*b*-3 is now categorized as logged (e.g., because it now maps to the first memory space of the first context), and that physical memory pages 401*b*-2 and 401*b*-4 are now categorized as not logged (e.g., because they no longer map to a logging context). Thus, it will be appreciated that, in some embodiments of method 500*a* the computer system performs a reallocation of one or more of the first memory space or the second memory space. In embodiments, based on the reallocation of the first memory space the computer system determines that one or more first region(s) (e.g., physical memory pages 401*b*-2 and 401*b*-4) are no longer within the first memory space, and recategorizes of the one or more first region(s) as being not logged. In additional or alternative embodiments, based on the reallocation of the first memory space the computer system identifies a third region (e.g., physical memory page 401*b*-3) within the memory corresponding to the first memory space, and configures the data structure with a third categorization of the third region as being logged.

In some embodiments, when categorizing a memory region as being logged, the data structure modifier 118*d* tags the categorization with one or more identifiers, such as a virtual processor identifier (VPID), associated with the executing context. In embodiments, a given memory region may be tagged with an identifier of more than one executing context, indicating that the memory region is being logged on behalf of more than one executing context. As will be discussed later, in some embodiments, the processor(s) 102 utilize this identifier as part of making a logging decision. Thus, in some embodiments, in act 504 configuring the data structure with the first categorization includes tagging the first region with an identifier.

Method 500*a* also includes an act of 505 of communicating the data structure to a processor. In some embodiments, act 503 comprises communicating, to the processor, at least one of the first categorization, the second categorization, or a reference to the data structure. For example, in some embodiments the data structure(s) 113 comprise memory PTE's and or PDEs stored in system memory 103 that contain the first and second categorizations. In these embodiments, the data structure manager 118*d* exposes these categorizations through natural operation of the processor 102 via operation of the processor's TLB(s) 108. In other embodiments, the data structure(s) 113 comprise one or more bitmaps stored in system memory 103 that comprise the first and second categorizations. In these embodiments, the data structure manager 118*d* exposes these categorizations by configuring one or more of registers 106*a* to access the bitmap(s). In other embodiments, the data structure(s) 113 comprise one or more of the registers 106*a*, themselves, and the data structure manager 118*d* exposes these categorizations by configuring those register(s).

In some embodiments, based on having communicated to the processor at least one of the first categorization, the second categorization, or the reference to the data structure, the processor initiates a logging action based at least on one or more of (i) a particular processing unit of the one or more processing units executing the first context, or (ii) a target memory address of a memory access being categorized as being logged within the data structure. In other embodiments, based on having communicated to the processor at least one of the first categorization, the second categorization, or the reference to the data structure, the processor refrains from initiating the logging action based at least on one or more of (i) the target memory address being categorized as being not logged within the data structure, or (ii) a type of the memory access being a write. These embodiments are now described in greater detail in reference to method 500*b*.

As shown, method 500*b* (e.g., performed based at least on operation of control logic 109 at one or more of processor(s) 102) includes an act of 506 of executing an execution context at a processing unit. In some embodiments, act 506 comprises executing machine code instructions of one of the first or second execution contexts discussed in connection with method 500*a*.

Method 500*b* also includes an act of 507 of detecting a memory access by the processing unit, the memory access targeted to a particular memory address. In some embodiments, act 507 comprises detecting a memory access by a particular one of the one or more processing units, the memory access being targeted at a particular memory address. In an example, the memory access detector 114 detects when a machine code instruction of the first or second execution context accesses a location in system memory 103 (e.g., via a request to the cache(s) 107).

From act 507, method 500*b* proceeds to one or more of (i) an act 508 of consulting the data structure(s) to determine if the particular memory address is categorized as logged or not logged, (ii) an act 509 determining if the processing unit is logging or not logging, or (iii) an act 510 of determining a type of the memory access. In FIG. 5, acts 508, 509, and 510 are illustrated as being performed in parallel, though it will be appreciated that embodiments could alternatively perform these acts at least partially in serial (in any order). Acts 508, 509, and 510 are shown in broken lines to demonstrate that method 500b may, or may not, include each act for a given memory access.

In some embodiments, act 508 (i.e., of consulting the data structure(s) to determine if the particular memory address is categorized as logged or not logged) comprises, based at least on detecting the memory access by the particular processing unit, determining whether the particular memory address is categorized as being logged or not logged. In an example, the memory categorization determiner 115 accesses data structures(s) 113, or a portion thereof, to determine whether the accessed memory address is within a memory region that is categorized a logged, or a memory region that is categorized as not logged. Notably, in embodiments the memory categorization determiner 115 operates regardless of whether the accessed memory address has already been cached in the cache(s) 107, or not. Thus, in embodiments, the processor 102 conducts act 508 in connection with at least one of processing a cache miss for the particular memory address, or in connection with locating an existing cache line overlapping with the particular memory address.

In various embodiments, the memory categorization determiner 115 accesses the data structures 113 directly (i.e., from system memory 103) and/or via on-processor storage (e.g., registers 106a, cache(s) 107, TLB(s) 108, etc.). For example, if the data structures(s) 113 comprise memory page and/or directory tables, then in embodiments the memory categorization determiner 115 accesses a at least one of PTE or a PDE corresponding to the accessed memory address from TLB(s) 108 and determines if flag bit(s) in that PTE/PDE indicate if a corresponding memory page is categorized as being logged or if the memory page is categorized as being not logged. Thus, in embodiments of act 508, determining whether the particular memory address is categorized as being logged or not logged comprises identifying, from a PTE or a PDE of a corresponding memory page containing the particular memory address, one or more PTE or PDE flags that indicate whether the corresponding memory page is categorized as being logged or not logged.

In another example, if the data structures(s) 113 comprise a bitmap stored in system memory 103, then in embodiments the memory categorization determiner 115 reads the bitmap from system memory 103 and/or from the cache(s) 107, and determines if a bit in that bitmap indicates if a corresponding memory region is categorized as being logged or as being not logged. Thus, in embodiments of act 508, determining whether the particular memory address is categorized as being logged or not logged comprises identifying, from a bitmap, a bit associated with a corresponding memory region containing the particular memory address, the bit indicating whether the corresponding memory region is categorized as being logged or not logged.

In another example, if the data structure manager 118d stored information in one or more of registers 106a (e.g., a memory range within a breakpoint comparator register, a pointer to the bitmap, a size of the data referenced by each bit on the bitmap, etc.) the memory categorization determiner 115 can consult a processor register, as appropriate. Thus, in embodiments of act 508, determining whether the particular memory address is categorized as being logged or not logged comprises identifying, from a processor register, at least one of a base memory address or a memory size that are usable to determine whether the particular memory address is categorized as being logged or not logged.

In some embodiments, act 509 (i.e., of determining if the processing unit is logging or not logging) comprises, based at least on detecting the memory access by the particular processing unit, determining whether the particular processing unit is executing within a logging context or within a non-logging context. In an example, based on user input, or based on a policy, the tracer 118 (or some component related thereto) may have determined that the executing context is, or is not, to be traced during its execution, and created some indication (e.g., in system memory 103, in durable storage 104, in a register 106a, etc.) that the executing context is assigned the logging state or the non-logging state. Thus, in act 509, the logging state determiner 116 uses this indication to determine whether the processing unit is executing a context that is assigned the logging state, or whether the processing unit is executing a context that is assigned the non-logging state.

In some embodiments, act 510 (i.e., of determining a type of the memory access) comprises, based at least on detecting the memory access by the particular processing unit, determining a type of the memory access. For example, as part of detecting the memory access, the memory access detector 114 can determine a type of that memory access. As will be appreciated by those of ordinary skill in the art, a memory access can come in a variety of types, such as a read (load), a write (store), a speculative read, a prefetch, a speculative write, an implicit read, etc.

As shown in FIG. 5, the results of one or more of acts 508, 509, or 510 are utilized by an act 511 of making a logging decision. In some embodiments, act 511 comprises either act 511a of logging the memory access (e.g., using the logging logic 117a of the logging handler 117), or an act 511b of omitting logging of the memory access (e.g., using the non-logging logic 117b of the logging handler 117). In some embodiments act 511a, comprises based on the determining (i.e., of acts 508, 509, and/or 510), initiating a logging action based at least on one or more of (i) the particular processing unit executing within the logging context, or (ii) the particular memory address being categorized as being logged. In other embodiments act 511b comprises, based on the determining (i.e., of acts 508, 509, and/or 510), refraining from initiating the logging action based at least on one or more of (i) the particular memory address being categorized as being not logged, or (ii) the memory access being a write.

To demonstrate some embodiments of operation of act 511 and the logging handler 117, FIG. 6 illustrates an example an example table 600 showing a matrix of at least some logging decisions by the logging handler 117, in some embodiments. As shown in FIG. 6, table 600 includes a variety of logging or non-logging actions in boxes 601-608, based on one or more of (i) the logging state of the execution context (i.e., as determined in act 509), (ii) the categorization of the accessed memory region (i.e., as determined in act 508), or (iii) and a type of the memory access (i.e., as determined in act 510). As mentioned, memory accesses can come in a variety of types, such reads, writes, speculative reads, prefetches, speculative writes, implicit reads, etc. Table 600 focuses on situations in which the memory access caused a cache miss (regardless of the access type), and on situations in which the memory access caused a write which is actually committed (e.g., writes and correctly speculated speculative writes). In some embodiments, the logging handler 117 invokes non-logging logic 117b for non-committed write memory accesses (e.g., incorrectly speculated speculative writes), while in other embodiments the control logic 109 refrains from invoking the logging handler 117 at all on non-committed write memory accesses. To provide an understanding of act 511 and the logging handler 117, a particular description of each of boxes 601-608 is now given.

As shown in box 601, in embodiments the logging logic 117a initiates a logging action for the memory access by logging a cache miss into an execution trace 112/112'. In embodiments, the logging logic 117a initiates the logging action based on one or more of (i) the particular processing unit executing within a logging context, (ii) the particular memory address being categorized as being logged, or (iii) the memory access causing a cache miss. Here, logging the cache miss records an influx into the cache(s) 107 that are caused by a logged execution context, and thus enables the value(s) of that influx to be later reproduced later from the execution trace 112/112' during replay of that context.

As shown in box 602, in embodiments the non-logging logic 117b refrains initiating a logging action for the memory access. In embodiments, the non-logging logic 117b refrains from initiating the logging action based on one or more of (i) the particular processing unit executing within a logging context, (ii) the particular memory address being categorized as being logged, or (iii) the memory access performing a write that is committed (or being committed). Here, even though the particular processing unit is executing within a logging context, and even though the particular memory address is categorized as being logged, the value written by the memory access can be reproduced by replay of prior machine code instructions that produced that value, and thus in some embodiments a complete execution trace 112/112' need not include a record of the write.

As shown in box 603, in some embodiments the logging logic 117a initiates one or more logging actions for the memory access, while in other embodiments the non-logging logic 117b refrains from initiating a logging action and/or triggers a fault. Either way, the logging logic 117a or the non-logging logic 117b operate based on one or more of (i) the particular processing unit executing within a logging context, (ii) the particular memory address being categorized as being not logged, or (iii) the memory access causing a cache miss. In embodiments in which the logging logic 117a initiates one or more logging actions for the memory access, the logging logic 117a does so even though the particular memory address was categorized as being not logged. In these embodiments, the logging logic 117a initiates the logging action because the executing context is in the logging state, and because the logging action ensures a complete execution trace 112/112' for the executing context. As shown, in embodiments the logging action includes one or more of logging the cache miss, logging the memory access as an uncached read, or updating the logging categorization for the memory address (and/or it's corresponding memory region) to being logged. In embodiments, logging logic 117a updates the logging categorization for the memory address/region based on updating a bit in a bitmap, updating a PTE or PDE in the TLBs(s) 108, updating a register, and the like. In embodiments in which the non-logging logic 117b refrains from logging or initiates a fault, the non-logging logic 117b does so even though the execution context was in a logging state. In these embodiments, the non-logging logic 117b refrains from logging and/or initiates a fault to avoid logging a memory address that may have been intentionally marked as not logged (e.g., to avoid logging sensitive information), or to avoid logging a memory address that has been marked as being otherwise reconstructable or predictable (e.g., via access to a memory-mapped file, via access to a stored memory snapshot, via emulation of a memory-mapped hardware device, via reproduction of a well-known behavior, by combining available data in known ways, etc.). Notably, if the non-logging logic 117b refrains from logging the memory access and does not initiate a fault in box 603, then in embodiments the execution trace 112/112' of the execution context is incomplete unless the value of the memory address is otherwise reconstructable or predictable. In some embodiments, the non-logging logic 117b refrains from logging if the memory address been marked as being otherwise reconstructable or predictable, and faults otherwise.

As shown in box 604, in embodiments the non-logging logic 117b refrains initiating a logging action for the memory access. In embodiments, the non-logging logic 117b refrains from initiating the logging action based on one or more of (i) the particular processing unit executing within a logging context, (ii) the particular memory address being categorized as being not logged, or (iii) the memory access performing a write that is committed (or being committed). Here, even though the particular processing unit is executing within a logging context, the value written by the memory access can be reproduced by replay of prior machine code instructions that produced that value, and thus in some embodiments a complete execution trace 112/112' need not include a record of the write.

As shown in box 605, in embodiments the logging logic 117a initiates a logging action for the memory access by logging a cache miss into an execution trace 112/112'. In embodiments, the logging logic 117a initiates the logging action based on one or more of (i) the particular processing unit executing within a non-logging context, (ii) the particular memory address being categorized as being logged, or (iii) the memory access causing a cache miss. In embodiments, the logging logic 117a initiates the logging action even though the executing context is in the non-logging state, because that non-logging context has brought data into the caches 107 that has been categorized as logged. If that data is not evicted prior to a logging context accessing it, the logging context may not cause a cache miss on the data, and thus in embodiments an execution trace 112/112' for the logging context may be incomplete. In one example, the non-logging context could be a kernel thread that accessing information that will also be accessed by a user mode process that is being traced. In this example, if the accessed data is not logged during execution of the kernel thread, there is a risk that it is not logged during a later execution of the user mode process because it is already in the cache(s) 107.

As shown in box 606, in embodiments the logging logic 117a initiates a logging action for the memory access. In embodiments, the logging logic 117a initiates the logging action based on one or more of (i) the particular processing unit executing within a non-logging context, (ii) the particular memory address being categorized as being logged, or (iii) the memory access being a write that is committed (or being committed). In embodiments, the logging logic 117a initiates the logging action even though the executing context is in the non-logging state because that non-logging context has modified the value of a memory address that is categorized as being logged. If no logging action is taken, then in embodiments an execution trace 112/112' for a logging context is incomplete. In embodiments, the logging action includes one or more of logging the write (e.g., into an execution trace 112/112' of a logging context), or evicting the cache line after it is written to. In embodiments, when evicting the cache line, no logging of the write needs to be performed, since the value of the write will be logged as an influx (cache miss) if the logging context accesses it later.

As shown, in box 606 in some embodiments the logging logic 117*a* postpones logging the write and/or evicting the cache line. For example, if the non-logging context writes to the cache line repeatedly, in embodiments the logging logic 117*a* only logs the last write, or only evicts the cache line after the last write. In some embodiments, the logging logic 117*a* postpones a logging action based on a cache coherency protocol (CCP) status maintained by the cache(s) 107. In some embodiments, in connection with a context switch away from the non-logging context, the logging logic 117*a* uses CCP status to determine which cache line(s) that are categorized as logged have a dirty status and evicts those cache lines. In other embodiments, the logging logic 117*a* postpones a logging action based on maintaining tracking status for cache lines or memory pages and the TLB(s) 108 or in system memory 103.

As shown in box 607, in embodiments the non-logging logic 117*b* refrains initiating a logging action for the memory access. In embodiments, the non-logging logic 117*b* refrains from initiating the logging action based on one or more of (i) the particular processing unit executing within a non-logging context, (ii) the particular memory address being categorized as being not logged, or (iii) the memory access performing a read. Here, the particular processing unit is executing within a non-logging context, and the particular memory address is categorized as being not logged, and thus there is no need to log the read.

As shown in box 608, in embodiments the non-logging logic 117*b* refrains initiating a logging action for the memory access. In embodiments, the non-logging logic 117*b* refrains from initiating the logging action based on one or more of (i) the particular processing unit executing within a non-logging context, (ii) the particular memory address being categorized as being not logged, or (iii) the memory access performing a write. Here, the particular processing unit is executing within a non-logging context, and the particular memory address is categorized as being not logged, and thus there is no need to log the write.

In embodiments, when logging a cache miss, the logging logic 117*a* logs one or both of the memory address that is the target of the memory access, or a corresponding memory value that is obtained via the cache miss. In some embodiments, the logging logic 117*a* logs both the memory address and the value. However, in other embodiments, the logging logic 117*a* logs the memory address but refrains from logging the value. In these other embodiments, the logging logic 117*a* logs some additional information that is usable to infer or reconstruct the value, such as at least a portion of CCP messages, a branch trace or call trace, or a hash of the processor registers 106*a*.

In view of the foregoing discussion of table 600, it will be appreciated that in some embodiments of act 511, the logging logic 117*a* causes the processor to initiate the logging action based at least on the particular processing unit executing within the logging context. In these embodiments, initiating the logging action in act 511*a* comprises at least one of the following when the memory access causes a cache miss: (i) when the particular memory address is categorized as being logged, logging at least one of the particular memory address and or a corresponding value from the cache miss (e.g., box 601), or (ii) when the particular memory address is categorized as being not logged, performing one or more of logging at least one of the particular memory address and or a corresponding value from the cache miss, logging an uncached read or categorizing the particular memory address as being logged (e.g., the logging section within box 603). In some embodiments, when categorizing the particular memory address as being logged, act 511 comprises updating at least one of: a bit in a bitmap, a memory address in a register, or a TLB entry.

In view of the foregoing discussion of table 600, it will also be appreciated that in some embodiments of act 511, the logging logic 117*a* causes the processor to initiate the logging action based at least on the particular memory address being categorized as being logged. In these embodiments, initiating the logging action in act 511*a* comprises at least one of: (i) when the memory access causes a cache miss, logging at least one of the particular memory address and or a corresponding value from the cache miss (e.g., box 601 or box 605), or (ii) when the memory access performs a committed write to a cache line, and when the particular processing unit is executing within the non-logging context, performing one or more of logging the write to the cache line, or logging the write to the cache line and evicting the cache line (e.g., box 606). In some embodiments, the logging logic 117*a* delays the logging action based on one or more of (i) a value of a cache coherency protocol transition, or (ii) a value of a tracking bit.

In view of the foregoing discussion of table 600, it will also be appreciated that in some embodiments of act 511, the non-logging logic 117*b* causes the processor to refrain from initiating the logging action based at least on the particular memory address being categorized as being not logged (e.g., the non-logging section within box 603, box 607, or box 608), and in some embodiments of act 511, the non-logging logic 117*b* causes the processor to refrain from initiating the logging action based at least on the memory access being a write (e.g., box 602, 604, or 608).

As mentioned, in embodiments, when categorizing a memory region as being logged, the data structure modifier 118*d* tags the categorization with an identifier, such as a VPID, associated with the executing context, and the processor(s) 102 utilize this identifier as part of making a logging decision. Thus, in some embodiments the logging handler 117 determines a first identifier associated with the particular memory address, and determines a second identifier associated with the logging context, and act 511 includes initiate the logging action, or refraining from initiating the logging action, based further on whether or not there is a match between the first identifier and the second identifier. In an example, the logging handler 117 determines whether an identifier of the executing context matches an identifier of a context for which a given memory address is tagged for logging, and makes a logging decision based on whether or not there is a match. In an example, whether executing a logging or non-logging context, if a target memory address corresponds to a memory region that is categorized as being logged and that is tagged with the identifiers of multiple logging contexts, the logging handler 117 may initiate logging actions into multiple execution traces (e.g., corresponding to the logging contexts). In another example, when executing a logging context, if a target memory address corresponds to a memory region that is categorized as being logged and that is tagged with a non-matching identifier, the logging handler 117 may choose to refrain from logging.

In addition to assigning a logging or non-logging state to execution contexts, some embodiments enable logging to be enabled or disabled globally for one or more of the processor(s) 102. In these embodiments, the control logic 109 only determines if a memory address and/or execution context should be logged if logging is globally enabled for the processor 102 at the time that the memory access was detected in act 507. Thus, in some embodiments of method 500b, the control logic 109 also causes the processor 102 to determine if logging is enabled or disabled for the processor, and initiate one or more of acts 508, 509, or 511 only when logging is globally enabled for the processor 112.

Although not shown in method 500, in some embodiments, when logging is enabled globally for one or more of the processor(s) 102 and/or when an execution context is assigned the logging state (i.e., when logging is enabled for the context), the computer system 101 places the cache(s) 107 in a known initial state for tracing, and/or logs data sufficient to reproduce an initial cache state during trace reply. In embodiments, this is done for the entire cache(s) 107, while in other embodiments, it is done for only subset(s) of the cache(s) 107 that store data within the memory space(s) of any execution context(s) for which logging is enabled. In embodiments, the computer system 101 places the cache(s) 107 in a known initial state for tracing by flushing at least a subset of cache lines in the cache(s) 107, and/or by invalidating at least a subset of cache lines in the cache(s) 107 (e.g., those cache line(s) that store data within the memory space(s) of any execution context(s) for which logging is enabled). In embodiments, the computer system 101 logs data sufficient to reproduce an initial cache state during trace reply by logging a snapshot of at least a subset of cache lines in the cache(s) 107 (e.g., those cache line(s) that store data within the memory space(s) of any execution context(s) for which logging is enabled).

When method 500 is implemented in environments that include multiple processing unit(s) 106 and/or multiple processor(s) 102, some embodiments log additional information into the execution trace(s) 112/112' that can be used to later reconstruct/disambiguate the ordering of reads and writes by these multiple processing units 106 and/or processors 102 within shared portion(s) of the cache(s) 107. In embodiments, this additional information includes one or more of (i) at least a subset of CCP messages communicated between these multiple processing units 106 and/or processors 102, (ii) explicit ordering information (e.g., by associating log events with monotonically increasing values), (iii) some form of a processor code trace (e.g., a branch trace or a call trace), or (iv) data that can be used to disambiguate possible paths during replay (e.g., by storing occasional hashes over the values of one or more of registers 106, and which can be compared against by reconstructed register state during replay).

Accordingly, at least some embodiments described herein use memory markings as logging cues for processor-based execution tracing. These embodiments categorize different memory regions, such as physical memory pages, as being logged or not logged based, at least in part, on whether or not logging is enabled or disabled for a corresponding execution context. When processing a memory access, a processor accesses these memory markings to determine if the memory region to which the memory access is targeted is categorized as logged or not logged. The processor then uses the determination as an input to determine whether or not to perform a logging action for the memory access. In embodiments, using memory markings as logging cues for processor-based execution tracing provides distinct technical advantages over prior techniques, such as the use of cache-based tracking bits. For example, the use of memory markings as logging cues for processor-based execution tracing decreases the complexity of processor design, pushes tracking logic out of the critical execution paths of the processor, and can be implemented within smaller IC die sizes. At the same time, the use of memory markings as logging cues can reduce trace size in many of the same ways as the use of cache-based tracking bits. For example, use of memory markings eliminates redundant logging of many cache influxes that were previously cache evictions, and limits logging to only the memory spaces associated with execution contexts that are actually in a logging state.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A processor configured to make a logging decision based on accessing a categorization of a region in memory as being logged or not logged, the processor comprising:
   one or more processing units;
   a cache; and
   control logic that causes the processor to at least:
      detect a memory access by a particular one of the one or more processing units, the memory access being targeted at a particular memory address;
      based at least on detecting the memory access by the particular processing unit, determine whether the particular memory address is categorized as being logged or not logged and that the particular processing unit is executing within a logging context; and
      based on the determining, initiate a logging action including, based on the memory access causing a cache miss:
         when the particular memory address is categorized as being logged, logging at least one of the particular memory address or a corresponding value from the cache miss, or
         when the particular memory address is categorized as being not logged, performing one or more of:
            logging at least one of the particular memory address or a corresponding value from the cache miss;
            logging an uncached read; or
            categorizing the particular memory address as being logged.

2. The processor of claim 1, wherein categorizing the particular memory address as being logged comprises updating at least one of:
   a bit in a bitmap;
   a translation lookaside buffer (TLB) entry; or
   a memory address in a register.

3. The processor of claim 1, wherein the control logic causes the processor to initiate the logging action based at least on the particular memory address being categorized as being logged, and wherein initiating the logging action comprises logging at least one of the particular memory address or a corresponding value from the cache miss.

4. The processor of claim 3, wherein the control logic causes the processor to delay the logging action based on one or more of (i) a value of a cache coherency protocol transition, or (ii) a value of a tracking bit.

5. The processor of claim 1, wherein the control logic also causes the processor to:
determine a first identifier associated with the particular memory address, and determine a second identifier associated with the logging context; and
initiate the logging action based further on whether or not there is a match between the first identifier and the second identifier.

6. The processor of claim 1, wherein determining whether the particular memory address is categorized as being logged or not logged comprises ef: identifying, from a page table entry (PTE) of a corresponding memory page containing the particular memory address, one or more PTE flags that indicate whether the corresponding memory page is categorized as being logged or not logged.

7. The processor of claim 1, wherein determining whether the particular memory address is categorized as being logged or not logged comprises identifying, from a bitmap, a bit associated with a corresponding memory region containing the particular memory address, the bit indicating whether the corresponding memory region is categorized as being logged or not logged.

8. The processor of claim 1, wherein determining whether the particular memory address is categorized as being logged or not logged comprises identifying, from a processor register, at least one of a base memory address or a memory size that are usable to determine whether the particular memory address is categorized as being logged or not logged.

9. A method, implemented at a processor that includes one or more processing units and a cache, for making a logging decision based on accessing a categorization of a region in memory as being logged or not logged, the method comprising:
detecting a memory access by a particular one of the one or more processing units, the memory access being targeted at a particular memory address;
based at least on detecting the memory access by the particular processing unit, determining whether the particular memory address is categorized as being logged or not logged and that the particular processing unit is executing within a logging context or within a non-logging; and
based on the determining, initiating a logging action including, based on the memory access causing a cache miss:
when the particular memory address is categorized as being logged, logging at least one of the particular memory address or a corresponding value from the cache miss, or
when the particular memory address is categorized as being not logged, performing one or more of:
logging at least one of the particular memory address or a corresponding value from the cache miss;
logging an uncached read; or
categorizing the particular memory address as being logged.

10. The method of claim 9, wherein categorizing the particular memory address as being logged comprises updating at least one of:
a bit in a bitmap;
a translation lookaside buffer (TLB) entry; or
a memory address in a register.

11. The method of claim 9, wherein the method comprises initiating the logging action based at least on the particular memory address being categorized as being logged, and wherein initiating the logging action comprises logging at least one of the particular memory address or a corresponding value from the cache miss.

12. The method of claim 11, wherein the method comprises delaying the logging action based on one or more of (i) a value of a cache coherency protocol transition, or (ii) a value of a tracking bit.

13. The method of claim 9, wherein the method further comprises:
determining a first identifier associated with the particular memory address, and determining a second identifier associated with the logging context; and
initiating the logging action based further on whether or not there is a match between the first identifier and the second identifier.

14. The method of claim 9, wherein determining whether the particular memory address is categorized as being logged or not logged comprises identifying, from a page table entry (PTE) of a corresponding memory page containing the particular memory address, one or more PTE flags that indicate whether the corresponding memory page is categorized as being logged or not logged.

15. The method of claim 9, wherein determining whether the particular memory address is categorized as being logged or not logged comprises identifying, from a bitmap, a bit associated with a corresponding memory region containing the particular memory address, the bit indicating whether the corresponding memory region is categorized as being logged or not logged.

16. The method of claim 9, wherein determining whether the particular memory address is categorized as being logged or not logged comprises identifying, from a processor register, at least one of a base memory address or a memory size that are usable to determine whether the particular memory address is categorized as being logged or not logged.

17. A computer storage medium storing executable instructions that are executable by one or more processing units to make a logging decision based on accessing a categorization of a region in memory as being logged or not logged, the executable instructions executable by the one or more processing units to at least:
detect a memory access by a particular one of the one or more processing units, the memory access being targeted at a particular memory address;
based at least on detecting the memory access by the particular processing unit, determine whether the particular memory address is categorized as being logged or not logged and that the particular processing unit is executing within a logging context or within a non-logging context; and
based on the determining, perform one of: initiate a logging action, including, based on the memory access causing a cache miss:
when the particular memory address is categorized as being logged, logging at least one of the particular memory address or a corresponding value from the cache miss, or when the particular memory address is categorized as being not logged, performing one or more of:
logging at least one of the particular memory address or a corresponding value from the cache miss;
logging an uncached read; or
categorizing the particular memory address as being logged.

18. The computer storage medium of claim 17, wherein determining whether the particular memory address is categorized as being logged or not logged comprises identifying, from a page table entry (PTE) of a corresponding memory page containing the particular memory address, one or more PTE flags that indicate whether the corresponding memory page is categorized as being logged or not logged.

19. The computer storage medium of claim 17, wherein determining whether the particular memory address is categorized as being logged or not logged comprises identifying, from a bitmap, a bit associated with a corresponding memory region containing the particular memory address, the bit indicating whether the corresponding memory region is categorized as being logged or not logged.

20. The computer storage medium of claim 17, wherein determining whether the particular memory address is categorized as being logged or not logged comprises identifying, from a processor register, at least one of a base memory address or a memory size that are usable to determine whether the particular memory address is categorized as being logged or not logged.

* * * * *